United States Patent
Kabasawa et al.

(10) Patent No.: US 11,168,983 B2
(45) Date of Patent: Nov. 9, 2021

(54) SIGNAL PROCESSING APPARATUS, INERTIAL SENSOR, ACCELERATION MEASUREMENT METHOD, AND ELECTRONIC APPARATUS

(71) Applicant: SONY SEMICONDUCTOR SOLUTIONS CORPORATION, Kanagawa (JP)

(72) Inventors: Hidetoshi Kabasawa, Kanagawa (JP); Yusaku Kato, Kanagawa (JP); Satoshi Mitani, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 357 days.

(21) Appl. No.: 16/331,623

(22) PCT Filed: Oct. 3, 2017

(86) PCT No.: PCT/JP2017/035965
§ 371 (c)(1),
(2) Date: Mar. 8, 2019

(87) PCT Pub. No.: WO2018/088066
PCT Pub. Date: May 17, 2018

(65) Prior Publication Data
US 2019/0360809 A1    Nov. 28, 2019

(30) Foreign Application Priority Data
Nov. 11, 2016 (JP) .............................. JP2016-220963

(51) Int. Cl.
*G01C 19/5776* (2012.01)
*G01P 15/09* (2006.01)
(Continued)

(52) U.S. Cl.
CPC .......... *G01C 19/5776* (2013.01); *G01P 15/09* (2013.01); *G01P 15/123* (2013.01); *G01P 15/125* (2013.01); *G01P 15/18* (2013.01)

(58) Field of Classification Search
CPC ... G01C 19/5776; G01P 15/09; G01P 15/125; G01P 15/18; G01P 2015/0842
See application file for complete search history.

(56) References Cited

U.S. PATENT DOCUMENTS 7,882,740 B2    2/2011  Okada
2004/0168515 A1 *  9/2004  Lasalandra ......... G01P 15/0891
                                                                73/510
(Continued)

FOREIGN PATENT DOCUMENTS

EP          1953499 B1    9/2017
JP          2008-190931 A 8/2008
(Continued)

OTHER PUBLICATIONS

International Search Report and Written Opinion of PCT Application No. PCT/JP2017/035965, dated Oct. 31, 2017, 06 pages of ISRWO.

*Primary Examiner* — David J Bolduc
(74) *Attorney, Agent, or Firm* — Chip Law Group

(57) ABSTRACT

A signal processing apparatus according to an embodiment of the present technology includes an acceleration arithmetic unit. The acceleration arithmetic unit extracts, on a basis of a first detection signal and a second detection signal, the first detection signal including information related to an acceleration along at least a uniaxial direction and having an alternating-current waveform corresponding to the acceleration, the second detection signal including the information related to the acceleration and having an output waveform in which an alternating-current component corresponding to the acceleration is superimposed on a direct-current com- (Continued)

ponent, a dynamic acceleration component and a static acceleration component from the acceleration.

20 Claims, 19 Drawing Sheets

(51) Int. Cl.
    *G01P 15/12*         (2006.01)
    *G01P 15/125*       (2006.01)
    *G01P 15/18*         (2013.01)

(56) References Cited

U.S. PATENT DOCUMENTS

| | | | |
|---|---|---|---|
| 2004/0172167 A1* | 9/2004 | Pasolini | G01P 15/18 |
| | | | 700/245 |
| 2005/0284221 A1* | 12/2005 | Danisch | G01P 15/125 |
| | | | 73/488 |
| 2013/0186202 A1* | 7/2013 | Hansen | G01P 15/08 |
| | | | 73/514.38 |
| 2014/0135773 A1* | 5/2014 | Stein | A61B 17/1703 |
| | | | 606/80 |
| 2014/0165724 A1* | 6/2014 | Krylov | G01P 15/125 |
| | | | 73/514.15 |
| 2015/0268268 A1* | 9/2015 | Liu | G01P 15/125 |
| | | | 73/514.32 |
| 2017/0291811 A1* | 10/2017 | Younis | H03H 3/0076 |
| 2017/0321808 A1* | 11/2017 | Lang | F16C 19/527 |

FOREIGN PATENT DOCUMENTS

| | | |
|---|---|---|
| JP | 2013-125025 A | 6/2013 |
| JP | 2015-092145 A | 5/2015 |
| JP | 2016-059191 A | 4/2016 |

* cited by examiner

SIGNAL PROCESSING APPARATUS, INERTIAL SENSOR, ACCELERATION MEASUREMENT METHOD, AND ELECTRONIC APPARATUS

CROSS REFERENCE TO RELATED APPLICATIONS

This application is a U.S. National Phase of International Patent Application No. PCT/JP2017/035965 filed on Oct. 3, 2017, which claims priority benefit of Japanese Patent Application No. JP 2016-220963 filed in the Japan Patent Office on Nov. 11, 2016. Each of the above-referenced applications is hereby incorporated herein by reference in its entirety.

TECHNICAL FIELD

The present technology relates to a signal processing apparatus, an inertial sensor, an acceleration measurement method, an electronic apparatus, and a program, which detect an acceleration that acts on a detection target, for example.

BACKGROUND ART

In recent years, acceleration sensors using the MEMS (Micro Electro Mechanical Systems) technology have been widely used in the technical fields of posture detection of an electronic apparatus, position detection of a moving body, image stabilization of a camera, analysis of a motion of a human or object, and the like. In this type of acceleration sensors, there are known various detection methods such as a piezoelectric type, a piezoresistive type, and an electrostatic type (see, for example, Patent Literatures 1 to 3).

For example, Patent Literature 1 describes an inertial sensor that includes a membrane, a mass body provided at a lower part of the membrane, and detection means formed on the membrane and including a piezoelectric body and that measures an acceleration on the basis of an output of the detection means.

Further, Patent Literature 2 describes an inertial sensor that includes a plate-shaped member, a weight body, plate-shaped bridge parts connecting them, and piezoresistive elements respectively disposed at the root ends and tips of the plate-shaped bridge parts and that detects accelerations from the resistance variations of those piezoresistive elements.

Additionally, Patent Literature 3 describes an electrostatic device that includes a first electrode unit as a movable electrode and a second electrode unit as a fixed electrode and that detects a change in capacitance based on a change of a gap therebetween, to measure an acceleration.

CITATION LIST

Patent Literature

Patent Literature 1: Japanese Patent Application Laid-open No. 2013-125025

Patent Literature 2: Japanese Patent Application Laid-open No. 2015-92145

Patent Literature 3: Japanese Patent Application Laid-open No. 2016-59191

DISCLOSURE OF INVENTION

Technical Problem

The output of the conventional inertial sensor described above includes, in addition to a motion acceleration of an object as a detection target, a gravitational acceleration that acts on the object. For that reason, a measurement error of the motion acceleration is large when the object performs complicated behavior while changing the posture, and it has been difficult to improve detection accuracy of the acceleration.

In view of the circumstances as described above, it is an object of the present technology to provide a signal processing apparatus, an inertial sensor, an acceleration measurement method, an electronic apparatus, and a program that are capable of accurately measuring a motion acceleration that acts on an object.

Solution to Problem

A signal processing apparatus according to an embodiment of the present technology includes an acceleration arithmetic unit.

The acceleration arithmetic unit extracts, on a basis of a first detection signal and a second detection signal, the first detection signal including information related to an acceleration along at least a uniaxial direction and having an alternating-current waveform corresponding to the acceleration, the second detection signal including the information related to the acceleration and having an output waveform in which an alternating-current component corresponding to the acceleration is superimposed on a direct-current component, a dynamic acceleration component and a static acceleration component from the acceleration.

For the first detection signal and the second detection signal, the respective outputs of acceleration sensors different in detection methods are typically used. Each of the first detection signal and the second detection signal includes the dynamic acceleration component (AC component) such as a motion acceleration, but the second detection signal includes not only the AC component but also the static acceleration component (DC component) such as a gravitational acceleration. In the present technology, it is configured to extract the dynamic acceleration component and the static acceleration component from those first and the second detection signals. With this configuration, a motion acceleration that acts on an object can be accurately measured.

Each of the first detection signal and the second detection signal may further include information related to accelerations in multiaxial directions including the uniaxial direction. In this case, the acceleration arithmetic unit extracts the dynamic acceleration component and the static acceleration component for each of the multiaxial directions.

With this configuration, dynamic acceleration components along the three-axis directions can be accurately measured.

The acceleration arithmetic unit may typically include an arithmetic circuit that extracts the static acceleration component from the acceleration on a basis of a difference signal between the first detection signal and the second detection signal.

With this configuration, the static acceleration component can be extracted from acceleration information.

In this case, the acceleration arithmetic unit may further include a gain adjustment circuit that adjusts gain of each signal such that the first detection signal and the second detection signal have an identical level.

The acceleration arithmetic unit may further include a correction circuit that calculates a correction coefficient on a basis of the difference signal and corrects one of the first detection signal and the second detection signal by using the correction coefficient.

The correction circuit may be configured to correct the first detection signal by using the correction coefficient in a case where one of the first detection signal and the second detection signal has a predetermined acceleration change or larger.

Alternatively, the correction circuit may be configured to correct the second detection signal by using the correction coefficient in a case where one of the first detection signal and the second detection signal has a predetermined acceleration change or smaller.

Meanwhile, the acceleration arithmetic unit may further include a low-frequency sensitivity correction unit that corrects the dynamic acceleration component and the static acceleration component by using a composite value of the difference signals calculated for the respective multiaxial directions.

The arithmetic circuit may include a low-pass filter that causes a low-frequency component including the direct-current component to pass therethrough from the second detection signal, and a first subtracter that calculates a difference between the first detection signal and an output signal of the low-pass filter.

At this time, the subtracter may include an arithmetic device that subtracts the first detection signal from the second detection signal and further deletes a negative sign.

With this configuration, the static acceleration component can be extracted from the acceleration information.

In this case, the arithmetic circuit may further include a second subtracter that calculates a difference between the output signal of the low-pass filter and an output signal of the first subtracter, and an adder that adds the first detection signal and an output signal of the second subtracter.

With this configuration, the dynamic acceleration component can be extracted from the acceleration information.

The acceleration arithmetic unit may be configured to output the dynamic acceleration component and the static acceleration component in parallel or may be configured to output the dynamic acceleration component and the static acceleration component sequentially.

The signal processing apparatus may further include an angular velocity arithmetic unit that calculates, on a basis of a third detection signal including information related to angular velocities about multiple axes including the uniaxial direction, each of the angular velocities about the multiple axes.

An inertial sensor according to an embodiment of the present technology includes a sensor element and a controller.

The sensor element includes an element main body, a first acceleration detector unit, and a second acceleration detector unit. The element main body includes a movable portion movable by reception of an acceleration along at least a uniaxial direction. The first acceleration detector unit outputs a first detection signal, the first detection signal including information related to the acceleration that acts on the movable portion and having an alternating-current waveform corresponding to the acceleration. The second acceleration detector unit outputs a second detection signal, the second detection signal including the information related to the acceleration and having an output waveform in which an alternating-current component corresponding to the acceleration is superimposed on a direct-current component.

The controller includes an acceleration arithmetic unit that extracts a dynamic acceleration component and a static acceleration component from the acceleration on a basis of the first detection signal and the second detection signal.

The first acceleration detector unit may include a piezoelectric acceleration detection element that is provided to the movable portion.

Meanwhile, the second acceleration detector unit may include a piezoresistive acceleration detection element that is provided to the movable portion or an electrostatic acceleration detection element that is provided to the movable portion.

An acceleration measurement method according to an embodiment of the present technology includes: acquiring a first detection signal including information related to an acceleration along at least a uniaxial direction and having an alternating-current waveform corresponding to the acceleration; acquiring a second detection signal including the information related to the acceleration and having an output waveform in which an alternating-current component corresponding to the acceleration is superimposed on a direct-current component; and extracting a dynamic acceleration component and a static acceleration component from the acceleration on a basis of the first detection signal and the second detection signal.

An electronic apparatus according to an embodiment of the present technology includes an inertial sensor.

The inertial sensor includes a sensor element and a controller.

The sensor element includes an element main body, a first acceleration detector unit, and a second acceleration detector unit. The element main body includes a movable portion movable by reception of an acceleration along at least a uniaxial direction. The first acceleration detector unit outputs a first detection signal, the first detection signal including information related to the acceleration that acts on the movable portion and having an alternating-current waveform corresponding to the acceleration. The second acceleration detector unit outputs a second detection signal, the second detection signal including the information related to the acceleration and having an output waveform in which an alternating-current component corresponding to the acceleration is superimposed on a direct-current component.

The controller includes an acceleration arithmetic unit that extracts a dynamic acceleration component and a static acceleration component from the acceleration on a basis of the first detection signal and the second detection signal.

A program according to an embodiment of the present technology causes a signal processing apparatus to execute: acquiring a first detection signal including information related to an acceleration along at least a uniaxial direction and having an alternating-current waveform corresponding to the acceleration; acquiring a second detection signal including the information related to the acceleration and having an output waveform in which an alternating-current component corresponding to the acceleration is superimposed on a direct-current component; and extracting a dynamic acceleration component and a static acceleration component from the acceleration on a basis of the first detection signal and the second detection signal.

Advantageous Effects of Invention

As described above, according to the present technology, it is possible to accurately measure a motion acceleration that acts on an object.

It should be noted that the effects described herein are not necessarily limited, and any of the effects described in the present disclosure may be produced.

MODE(S) FOR CARRYING OUT THE INVENTION

Hereinafter, embodiments according to the present technology will be described with reference to the drawings.

First Embodiment

[Overall Configuration]

Figure 1:
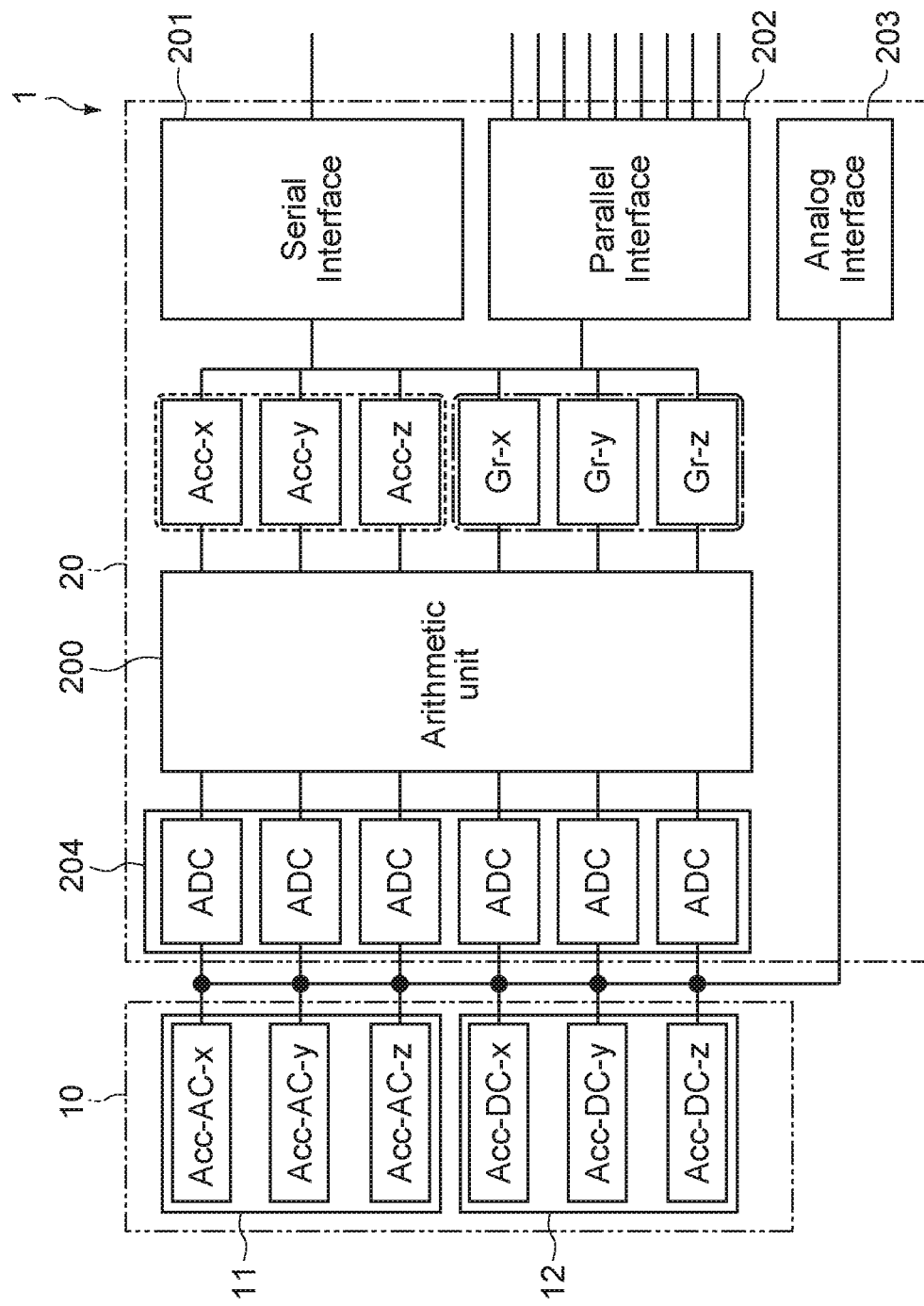
FIG. 1 is a block diagram showing a configuration of an inertial sensor according to an embodiment of the present technology.

FIG. 1 is a block diagram showing a configuration of an inertial sensor according to an embodiment of the present technology.

An inertial sensor 1 of this embodiment is incorporated in, for example, a moving body such as a vehicle or an aircraft, a portable information terminal such as a smartphone, an electronic apparatus such as a digital camera, a sensor head unit in a motion measurement apparatus, and the like. The inertial sensor 1 is configured as an acceleration sensor that detects accelerations in three-axis directions, which act on an object (detection target) such as the above-mentioned moving body, portable information terminal, electronic apparatus, and sensor head.

In particular, the inertial sensor 1 of this embodiment is configured to be capable of extracting dynamic acceleration components and static acceleration components from the respective accelerations in the three-axis directions described above.

Here, the dynamic acceleration component means an AC component of the acceleration described above and typically corresponds to a motion acceleration (translational acceleration, centrifugal acceleration, tangential acceleration, or the like) of the object described above. Meanwhile, the static acceleration component typically means a DC component of the acceleration described above and typically corresponds to a gravitational acceleration or an acceleration estimated as a gravitational acceleration.

Figure 2:
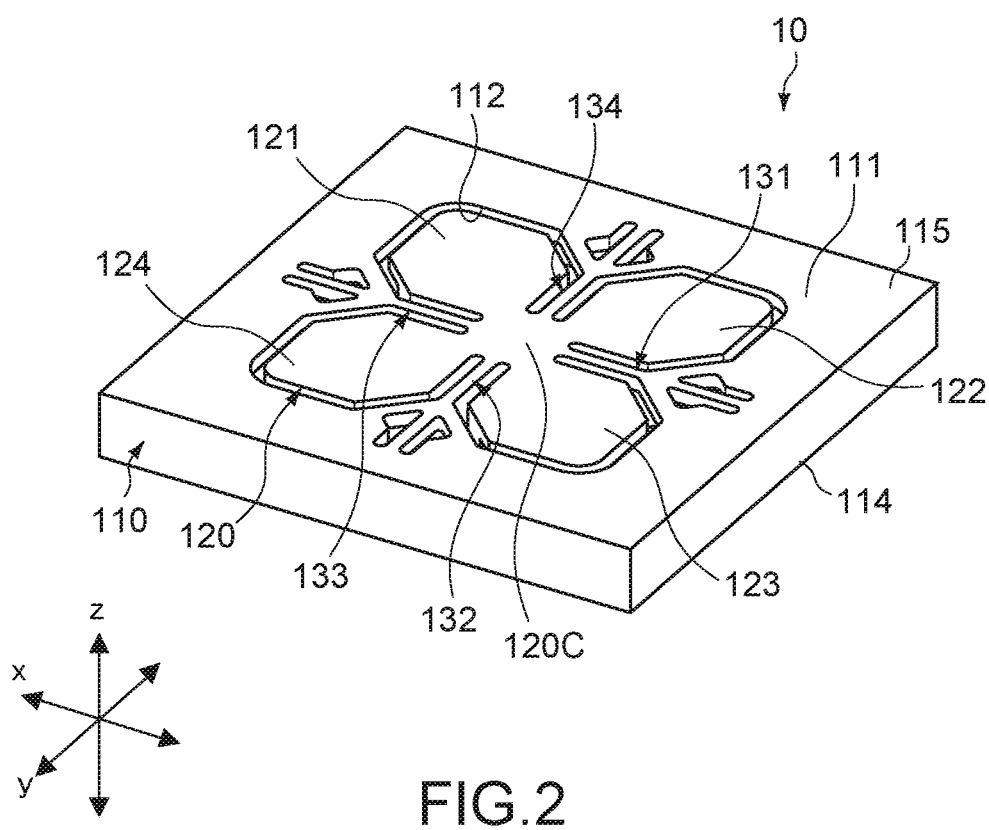
FIG. 2 is a schematic perspective view of the front surface side of a sensor element in the inertial sensor.

As shown in FIG. 1, the inertial sensor 1 includes a sensor element 10 and a controller 20 (signal processing apparatus). FIG. 2 is a perspective view of the front surface side, schematically showing a configuration of the sensor element 10.

The sensor element 10 includes two types of acceleration detector units (first acceleration detector unit 11 and second acceleration detector unit 12) that each detect information related to the accelerations in the three-axis (x, y, and z-axis) directions in FIG. 2.

The first acceleration detector unit 11 is a piezoelectric acceleration sensor, for example, and outputs, as a first detection signal, each of a signal (Acc-AC-x) including information associated with an acceleration parallel to the x-axis direction, a signal (Acc-AC-y) including information associated with an acceleration parallel to the y-axis direction, and a signal (Acc-AC-z) including information associated with an acceleration parallel to the z-axis direction. Those signals each have an alternating-current waveform corresponding to the acceleration of each axis.

Meanwhile, the second acceleration detector unit 12 is a non-piezoelectric acceleration sensor and outputs, as a second detection signal, each of a signal (Acc-DC-x) including information associated with an acceleration parallel to the x-axis direction, a signal (Acc-DC-y) including information associated with an acceleration parallel to the y-axis direction, and a signal (Acc-DC-z) including information associated with an acceleration parallel to the z-axis direction. Those signals each have an output waveform in which an alternating-current component corresponding to the acceleration of each axis is superimposed on a direct-current component.

The controller 20 includes an acceleration arithmetic unit 200 that extracts dynamic acceleration components and static acceleration components from the respective accelerations in the three-axis directions described above on the basis of the output of the first acceleration detector unit 11 (first detection signals) and the output of the second acceleration detector unit 12 (second detection signals).

It should be noted that the controller 20 may be achieved by hardware elements such as a CPU (Central Processing Unit), a RAM (Random Access Memory), and a ROM (Read Only Memory) used in a computer and necessary software. Instead of or in addition to the CPU, a PLD (Programmable Logic Device) such as a FPGA (Field Programmable Gate Array), a DSP (Digital Signal Processor), or the like may be used.

Subsequently, details of the inertial sensor 1 will be described.

[Sensor Element]

(Basic Configuration)

Figure 3:
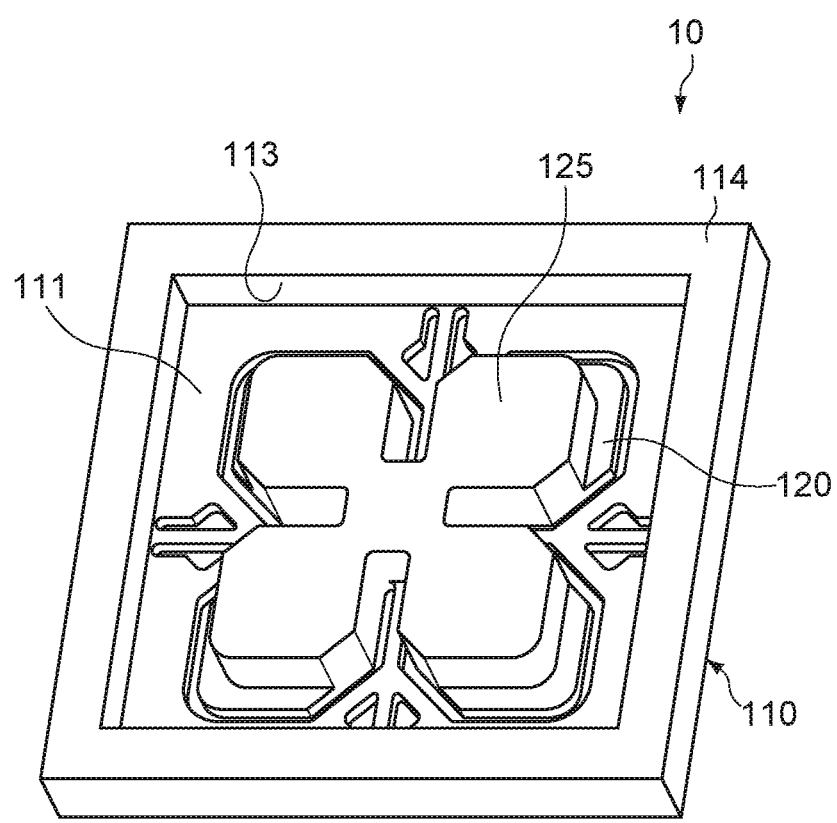
FIG. 3 is a schematic perspective view of the back surface side of the sensor element.
Figure 4:
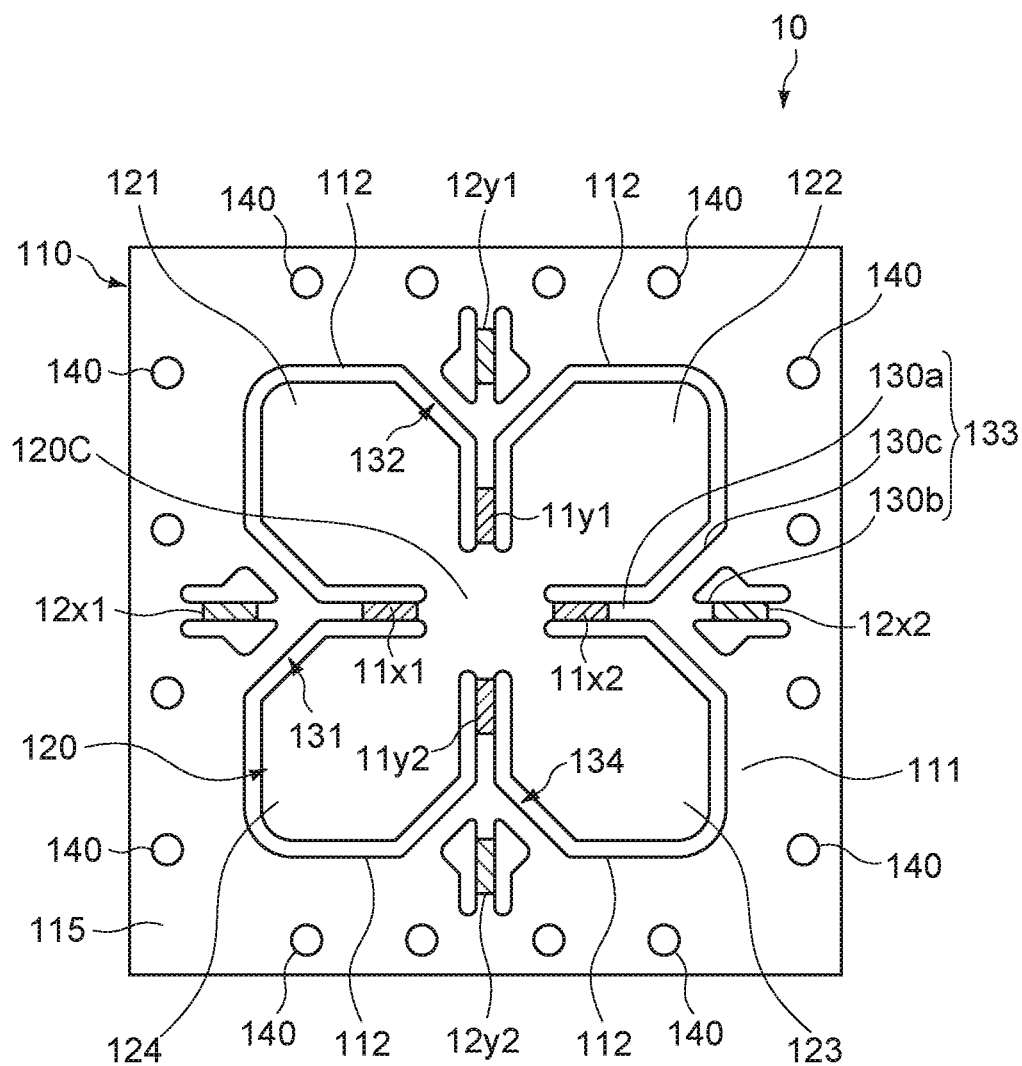
FIG. 4 is a plan view of the sensor element.

First, a basic configuration of the sensor element 10 will be described with reference to FIGS. 2 to 4. FIG. 3 is a perspective view of the back surface side of the sensor element 10. FIG. 4 is a plan view of the front surface side of the sensor element 10.

The sensor element 10 includes an element main body 110, the first acceleration detector unit 11 (first detection elements 11x1, 11x2, 11y1, 11y2), and the second acceleration detector unit 12 (second detection elements 12x1, 12x2, 12y1, 12y2).

The element main body 110 includes a main surface portion 111 parallel to the xy plane and a support portion 114 on the opposite side. The element main body 110 is typically constituted of an SOI (Silicon On Insulator) substrate and has a laminated structure including an active layer (silicon substrate), which forms the main surface portion 111, and a frame-shaped support layer (silicon substrate), which forms the support portion 114. The main surface portion 111 and the support portion 114 have thicknesses different from each other, and the support portion 114 is formed to be thicker than the main surface portion 111.

The element main body 110 includes a movable plate 120 (movable portion) capable of moving by reception of an acceleration. The movable plate 120 is provided at the center portion of the main surface portion 111 and is formed by processing the active layer forming the main surface portion 111 into a predetermined shape. More specifically, the movable plate 120 including a plurality of (four in this example) blade portions 121 to 124 each having the shape symmetric with respect to the center portion of the main surface portion 111 is constituted by a plurality of groove portions 112 formed in the main surface portion 111. The circumferential portion of the main surface portion 111 constitutes a base portion 115 that faces the support portion 114 in the z-axis direction.

As shown in FIG. 3, the support portion 114 is formed into a frame including a rectangular recess portion 113 in which the back surface of the movable plate 120 is opened. The support portion 114 is constituted as a joint surface to be joined to a support substrate (not shown in the figure). The support substrate may be constituted of a circuit board that electrically connects the sensor element 10 and the controller 20 or may be constituted of a relay board or package board that is electrically connected to the circuit board. Alternatively, the support portion 114 may include a plurality of external connection terminals electrically connected to the circuit board, the relay board, or the like.

The blade portions 121 to 124 of the movable plate 120 are each constituted of a piece of board having a predetermined shape (substantially hexagonal shape in this example) and are disposed at intervals of 90° about the center axis parallel to the z axis. The thickness of each of the blade portions 121 to 124 corresponds to the thickness of the above-mentioned active layer constituting the main surface portion 111. The blade portions 121 to 124 are mutually integrally connected at the center portion 120C of the movable plate 120 and are integrated and supported so as to be relatively movable to the base portion 115.

As shown in FIG. 3, the movable plate 120 further includes a weight portion 125. The weight portion 125 is integrally provided to the back surface of the center portion 120C of the movable plate 120 and the back surfaces of the respective blade portions 121 to 124. The size, the thickness, and the like of the weight portion 125 are not particularly limited and are set to have an appropriate size with which desired vibration properties of the movable plate 120 are acquired. The weight portion 125 is formed by, for example, processing the supporting layer forming the support portion 114 into a predetermined shape.

As shown in FIGS. 2 and 4, the movable plate 120 is connected to the base portion 115 via a plurality of (four in this example) bridge portions 131 to 134. The plurality of bridge portions 131 to 134 are each provided between the blade portions 121 to 124 and are formed by processing the active layer forming the main surface portion 111 into a predetermined shape. The bridge portion 131 and the bridge portion 133 are disposed to face each other in the x-axis direction, and the bridge portion 132 and the bridge portion 134 are disposed to face each other in the y-axis direction.

The bridge portions 131 to 134 constitute a part of the movable portion relatively movable to the base portion 115 and elastically support the center portion 120C of the movable plate 120. The bridge portions 131 to 134 each have an identical configuration and each includes, as shown in FIG. 4, a first beam portion 130a, a second beam portion 130b, and a third beam portion 130c.

The first beam portion 130a linearly extends from the circumferential portion of the center portion 120C of the movable plate 120 to each of the x-axis direction and the y-axis direction and is disposed between corresponding two of the blade portions 121 to 124 adjacent to each other. The second beam portion 130b linearly extends in each of the x-axis direction and the y-axis direction and couples the first beam portion 130a and the base portion 115 to each other.

The third beam portion 130c linearly extends in each of directions respectively intersecting with the x-axis direction and the y-axis direction and couples the intermediate portion between the first beam portion 130a and the second beam portion 130b and the base portion 115 to each other. Each of the bridge portions 131 to 134 includes two third beam portions 130c and is configured such that the two third beam portions 130c sandwich the single second beam portion 130b therebetween in the xy plane.

The rigidity of the bridge portions 131 to 134 is set to have an appropriate value at which the movable plate 120 that is moving can be stably supported. In particular, the bridge portions 131 to 134 are set to have appropriate rigidity at which the bridging portions 131 to 134 can be deformed by the self-weight of the movable plate 120. The magnitude of the deformation is not particularly limited as long as it can be detected by the second acceleration detector unit 12 to be described later.

As described above, the movable plate 120 is supported to the base portion 115 of the element main body 110 via the four bridge portions 131 to 134 and is configured to be capable of moving (movable) relative to the base portion 115 by an inertial force corresponding to the acceleration with the bridge portions 131 to 134 being set as a fulcrum.

Figure 5A:
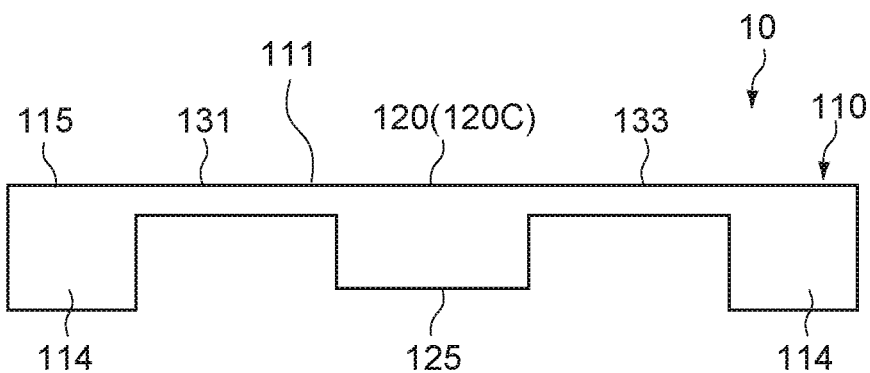
FIG. 5A is a schematic sectional side view of the acceleration sensor element when accelerations are not applied.
Figure 5B:
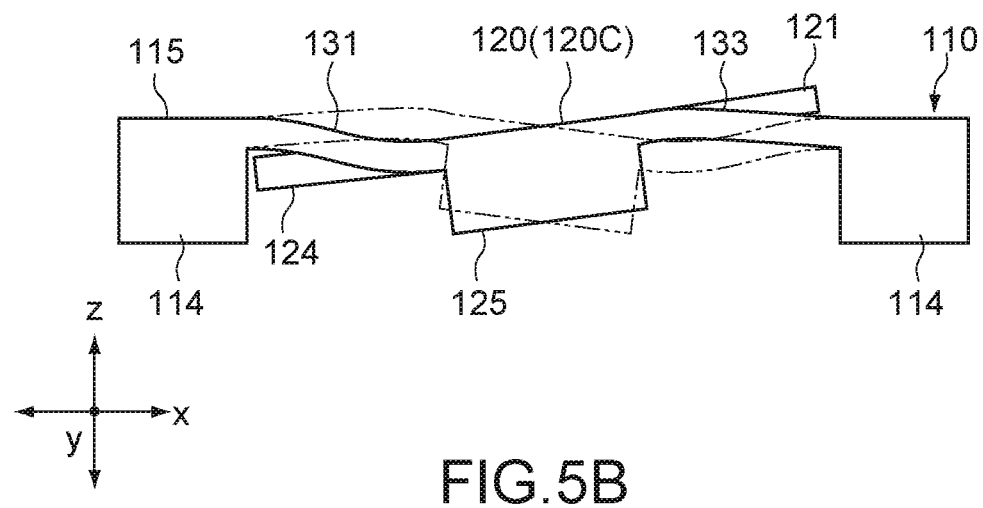
FIG. 5B is a schematic sectional side view of the acceleration sensor element when an acceleration along an x-axis direction occurs.
Figure 5C:
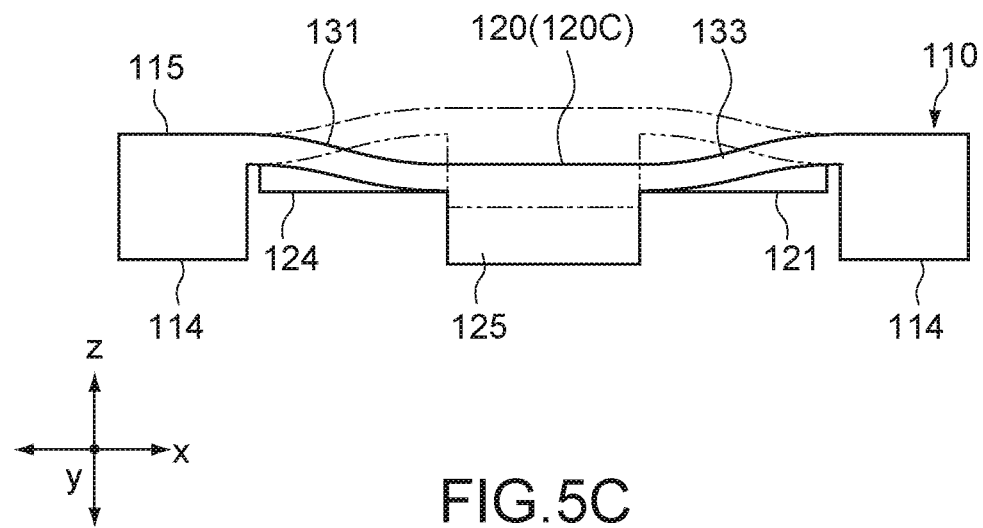
FIG. 5C is a schematic sectional side view of the acceleration sensor element when an acceleration along a z-axis direction occurs.

FIGS. 5A, 5B, and 5C are schematic sectional side views for describing a state of a motion of the movable plate 120, in which A shows a state where accelerations are not applied, B shows a state where the acceleration along the x-axis direction occurs, and C shows a state where the acceleration along the z-axis direction occurs. It should be noted that the solid line in FIG. 5B shows a state where the acceleration occurs in the left direction on the plane of the figure, and the solid line in FIG. 5C shows a state where the acceleration occurs in the upper direction on the plane of the figure.

When accelerations do not occur, as shown in FIGS. 2 and 5A, the movable plate 120 is maintained in a state parallel to the surface of the base portion 115. In this state, for example, when the acceleration along the x-axis direction occurs, as shown in FIG. 5B, the movable plate 120 tilts in the counterclockwise direction about the bridge portions 132 and 134 extending in the y-axis direction. With this configuration, the bridge portions 131 and 133 facing each other in the x-axis direction each receive bending stress in the directions opposite to each other along the z-axis direction.

Similarly, when the acceleration along the y-axis direction occurs, though not shown in the figure, the movable plate 120 tilts in the counterclockwise direction (or clockwise direction) about the bridge portions 131 and 133 extending in the x-axis direction. The bridge portions 132 and 134 facing each other in the y-axis direction each receive bending stress in the directions opposite to each other along the z-axis direction.

Meanwhile, when the acceleration along the z-axis direction occurs, as shown in FIG. 5C, the movable plate 120 rises and falls with respect to the base portion 115, and the bridge portions 131 to 134 each receive bending stress in an identical direction along the z-axis direction.

The first acceleration detector unit 11 and the second acceleration detector unit 12 are provided to each of the bridge portions 131 to 134. The inertial sensor 1 detects the deformation resulting from the bending stress of the bridge portions 131 to 134 by the acceleration detector units 11 and 12, and thus measures the direction and magnitude of the acceleration that acts on the sensor element 10.

Hereinafter, details of the acceleration detector units 11 and 12 will be described.

As shown in FIG. 4, the first acceleration detector unit 11 includes a plurality of (four in this example) first detection elements 11x1, 11x2, 11y1, and 11y2.

The detection elements 11x1 and 11x2 are provided on the axial centers of the respective surfaces of the two bridge portions 131 and 133 facing each other in the x-axis direction. One detection element 11x1 is disposed in the first beam portion 130a of the bridge portion 131, and the other detection element 11x2 is disposed in the first beam portion 130a of the bridge portion 133. In contrast to this, the detection elements 11y1 and 11y2 are provided on the axial centers of the respective surfaces of the two bridge portions 132 and 134 facing each other in the y-axis direction. One detection element 11y1 is disposed in the first beam portion 130a of the bridge portion 132, and the other detection element 11y2 is disposed in the first beam portion 130a of the bridge portion 134.

The first detection elements 11x1 to 11y2 each have an identical configuration and, in this embodiment, are each constituted of a rectangular piezoelectric detection element having a long side in the axial direction of the first beam portion 130a. The first detection elements 11x1 to 11y2 are each constituted of a laminate including a lower electrode layer, a piezoelectric film, and an upper electrode layer.

The piezoelectric film is typically made of piezoelectric zirconate titanate (PZT), but the present technology is not limited thereto as a matter of course. The piezoelectric film causes a potential difference, which corresponds to the amount of bending deformation (stress) of the first beam portion 130a in the z-axis direction, between the upper electrode layer and the lower electrode layer (piezoelectric effect). The upper electrode layer is electrically connected to each of the relay terminals 140 provided to the surface of the base portion 115 via a wiring layer (not shown in the figure) formed on the bridge portions 131 to 134. The relay terminal 140 may be configured as an external connection terminal electrically connected to the support substrate described above. For example, a bonding wire, one terminal of which is connected to the support substrate described above, is connected to the relay terminal 140 at the other terminal thereof. The lower electrode layer is typically connected to a reference potential such as a ground potential.

Since the first acceleration detector unit 11 configured as described above performs output only when the stress changes because of the characteristics of the piezoelectric film, and does not perform output in a state where a stress value is not changed even if the stress is applied, the first acceleration detector unit 11 mainly detects the magnitude of the dynamic acceleration (motion acceleration) that acts on the movable plate 120. Therefore, the output of the first acceleration detector unit 11 (first detection signal) mainly includes an output signal having an alternating-current waveform that is a dynamic component (AC component) corresponding to the motion acceleration.

Meanwhile, as shown in FIG. 4, the second acceleration detector unit 12 includes a plurality of (four in this example) second detection elements 12x1, 12x2, 12y1, and 12y2.

The detection elements 12x1 and 12x2 are provided on the axial centers of the respective surfaces of the two bridge portions 131 and 133 facing each other in the x-axis direction. One detection element 12x1 is disposed in the second beam portion 130b of the bridge portion 131, and the other detection element 12x2 is disposed in the second beam portion 130b of the bridge portion 133. In contrast to this, the detection elements 12y1 and 12y2 are provided on the axial centers of the respective surfaces of the two bridge portions 132 and 134 facing each other in the y-axis direction. One detection element 12y1 is disposed in the second beam portion 130b of the bridge portion 132, and the other detection element 12y2 is disposed in the second beam portion 130b of the bridge portion 134.

The second detection elements 12x1 to 12y2 each have an identical configuration and, in this embodiment, are each constituted of a piezoresistive detection element having a long side in the axial direction of the second beam portion 130$b$. The second detection elements 12$x$1 to 12$y$2 each include a resistive layer and a pair of terminal portions connected to both ends of the resistive layer in the axial direction.

The resistive layer is a conductor layer that is formed by, for example, doping an impurity element in the surface (silicon layer) of the second beam portion 130$b$, and causes a resistance change, which corresponds to the amount of bending deformation (stress) of the second beam portion 130$b$ in the z-axis direction, between the pair of terminal portions (piezoresistive effect). The pair of terminal portions is electrically connected to each of the relay terminals 140 provided to the surface of the base portion 115 via a wiring layer (not shown in the figure) formed on the bridge portions 131 to 134.

Since the second acceleration detector unit 12 configured as described above has a resistance value determined by an absolute stress value because of the piezoresistive characteristics, the second acceleration detector unit 12 detects not only the dynamic acceleration (motion acceleration) that acts on the movable plate 120 but also the static acceleration (gravitational acceleration) that acts on the movable plate 120. Therefore, the output of the second acceleration detector unit 11 (second detection signal) has an output waveform in which a dynamic component (AC component) corresponding to the motion acceleration is superimposed on a gravitational acceleration or a static component (DC component) corresponding to the gravitational acceleration.

It should be noted that the second detection elements 12$x$1 to 12$y$2 are not limited to the example in which the second detection elements 12$x$1 to 12$y$2 are each constituted of the piezoresistive detection element, and may be each constituted of other non-piezoelectric detection element capable of detecting the acceleration of the DC component, for example, like an electrostatic type. In a case of the electrostatic type, a movable electrode portion and a fixed electrode portion constituting an electrode pair are disposed to face each other in the axial direction of the second beam portion 130$b$ and are configured such that a facing distance between the electrode portions changes depending on the amount of bending deformation of the second beam portion 130$b$.

The first acceleration detector unit 11 outputs each of the acceleration detection signals in the respective x-axis direction, y-axis direction, and z-axis direction (Acc-AC-x, Acc-AC-y, Acc-AC-z) to the controller 20 on the basis of the outputs of the first detection elements 11$x$1 to 11$y$2 (see FIG. 1).

The acceleration detection signal in the x-axis direction (Acc-AC-x) corresponds to a difference signal (ax1-ax2) between the output of the detection element 11$x$1 (ax1) and the output of the detection element 11$x$2 (ax2$a$). The acceleration detection signal in the y-axis direction (Acc-AC-y) corresponds to a difference signal (ay1-ay2) between the output of the detection element 11$y$1 (ay1) and the output of the detection element 11$y$2 (ay2). Additionally, the acceleration detection signal in the z-axis direction (Acc-AC-z) corresponds to the sum of the outputs of the detection elements 11$x$1 to 11$y$2 (ax1+ax2+ay1+ay2).

Similarly, the second acceleration detector unit 12 outputs each of the acceleration detection signals in the respective x-axis direction, y-axis direction, and z-axis direction (Acc-DC-x, Acc-DC-y, Acc-DC-z) to the controller 20 on the basis of the outputs of the second detection elements 12$x$1 to 12$y$2 (see FIG. 1).

The acceleration detection signal in the x-axis direction (Acc-DC-x) corresponds to a difference signal (bx1-bx2) between the output of the detection element 12$x$1 (bx1) and the output of the detection element 12$x$2 (bx2). The acceleration detection signal in the y-axis direction (Acc-DC-y) corresponds to a difference signal (by1-by2) between the output of the detection element 12$y$1 (by1) and the output of the detection element 12$y$2 (by2). Additionally, the acceleration detection signal in the z-axis direction (Acc-DC-z) corresponds to the sum of the outputs of the detection elements 12$x$1 to 12$y$2 (bx1+bx2+by1+by2).

The arithmetic processing of the acceleration detection signals in the respective axial directions described above may be executed at a previous stage of the controller 20 or may be executed in the controller 20.

Hereinafter, an output example of the sensor element 10 will be described.

(Case 1)

Figure 6A:
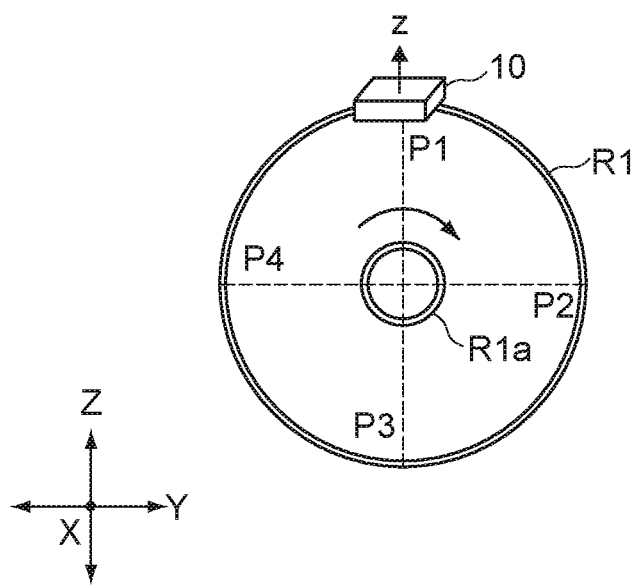
FIG. 6A is a schematic view showing an example of an acceleration that acts on the sensor element.
Figure 6B:
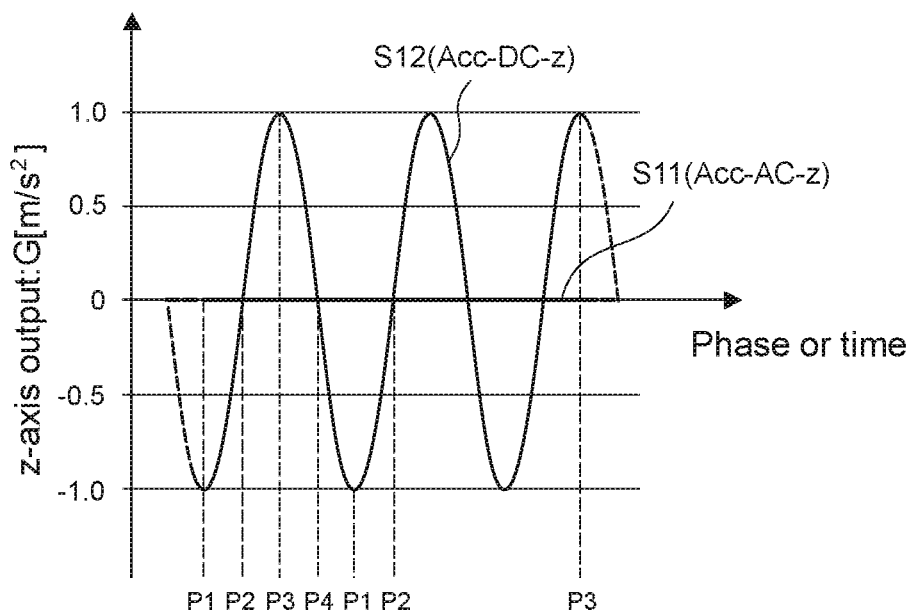
FIG. 6B is a diagram showing an example of a detection signal output from the sensor element in FIG. 6A.

For example, FIG. 6B shows an example of an output waveform in the z-direction detection axis of the sensor element 10 (first and second acceleration detector units 11 and 12) attached to, as shown in FIG. 6A, the peripheral surface of a rotor R1 that rotates at a constant rotational speed. It should be noted that the radius of rotation of the rotor R1 is set to be small such that the centrifugal force of the sensor element 10 has an ignorable magnitude (the same holds true for FIGS. 7A, 8A, and 9A). Further, in FIG. 6A, the X, Y, and Z axes represent directions of three orthogonal axes (the Z-axis is a vertical direction) in a real space (the same holds true for FIGS. 7A, 8A, and 9A), and in FIG. 6B, the horizontal axis represents the phase or time, and the vertical axis represents the magnitude of the acceleration in the z-axis direction (the same holds true for FIGS. 7B, 8B, 9B, 10A, and 10B).

The rotor R1 includes a rotation shaft R$ia$ that is parallel to the horizontal direction. The sensor element 10 is attached to the peripheral surface of the rotor R1 such that the z-direction detection axis thereof is directed to a radial direction of the rotor R1. Here, the upward direction in the figure is set as a gravity direction (see FIG. 6A). FIG. 6B shows each of a temporal change of a detection signal S11 output from the first acceleration detector unit 11 and a temporal change of a detection signal S12 output from the second acceleration detector unit 12, when the rotor R1 is rotated at a constant rotational speed in the clockwise direction of the figure.

Along with the rotation of the rotor R1, the magnitude of the gravitational acceleration that acts on the z axis of the sensor element 10 periodically changes. Further, since the sensor element 10 is rotated at a constant rotational speed about the X axis, a temporal change in motion acceleration (dynamic acceleration) to be added to the sensor element 10 is not caused. Therefore, since the first acceleration detector unit 11 including the piezoelectric detection elements is little affected by the influence of the gravity irrespective of a rotational position, the detection signal S11 (Acc-AC-z) becomes flat (constant). It should be noted that detection signals in the x-direction detection axis and the y-direction detection axis (Acc-AC-x, Acc-AC-y) are also zero, though not shown in the figure.

In contrast to this, in the second acceleration detector unit 12 including the piezoresistive detection elements, the magnitude of the output varies depending on the rotational position of the sensor element 10 (positions P1 to P4 in FIG. 6A). The output becomes maximum at a rotational position (P1, P3) at which the z-direction detection axis is parallel to the Z-axis, and the output becomes zero at a rotational position (P2, P4) at which the z-direction detection axis is perpendicular to the Z-axis. Thus, in the detection signal S12 (Acc-DC-z), a static acceleration with a 2 G width (−1 G to +1 G) with respect to the rotational motion is detected. It should be noted that the outputs of the detection signals in the x-direction detection axis and the y-direction detection axis (Acc-DC-x, Acc-DC-y) have a relationship orthogonal to the gravity direction, and thus the outputs are zero in principle, though not shown in the figure.

(Case 2)

Figure 7A:
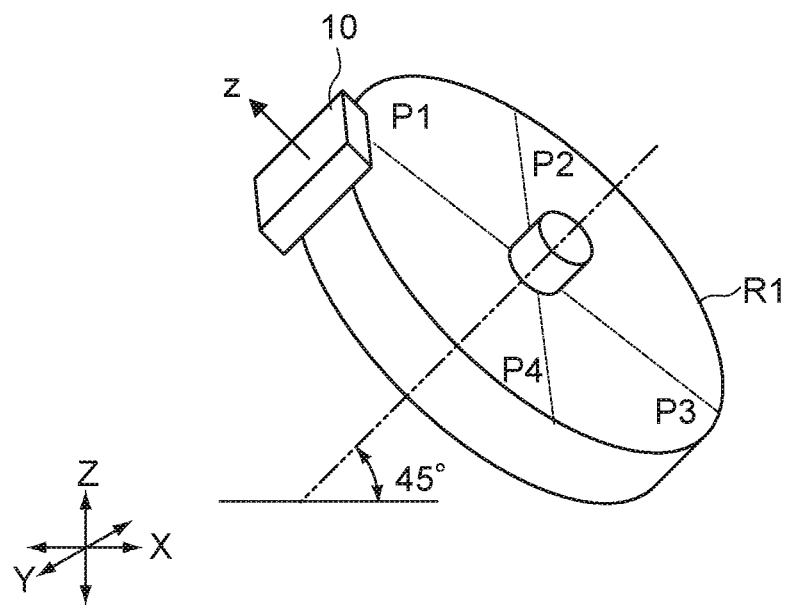
FIG. 7A is a schematic view showing an example of an acceleration that acts on the sensor element.
Figure 7B:
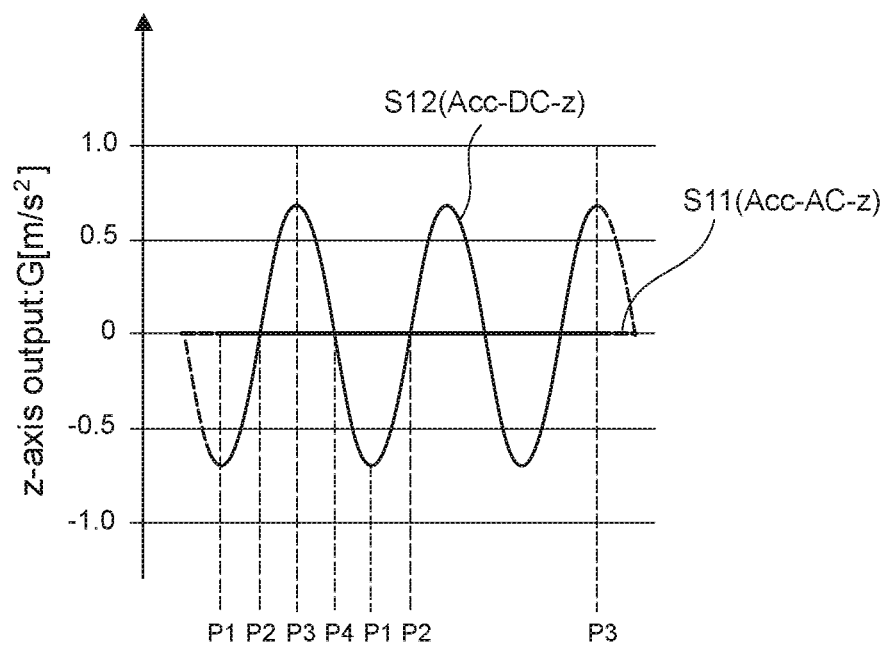
FIG. 7B is a diagram showing an example of a detection signal output from the sensor element in FIG. 7A.

FIG. 7B shows an example of an output waveform in the z-direction detection axis of the sensor element 10 when the rotation shaft of the rotor R1 is tilted obliquely (e.g., 45°) to the horizontal axis as shown in FIG. 7A. The detection signal S11 (Acc-AC-z) of the first acceleration detector unit 11 becomes zero as in Case 1. Meanwhile, for the detection signal S12 (Acc-DC-z) of the second acceleration detector unit 12, since the z-direction detection axis of the sensor element 10 is tilted by 45° with respect to the vertical direction (Z-axis direction), the maximum value of the output is smaller than that of Case 1, and a static acceleration with a √2 G width (−√2G/2 to +√2G/2) with respect to the rotational motion is detected. In this case, in the x-direction detection axis or the y-direction detection axis, a gravitational acceleration corresponding to the rotational position is detected.

(Case 3)

Figure 8A:
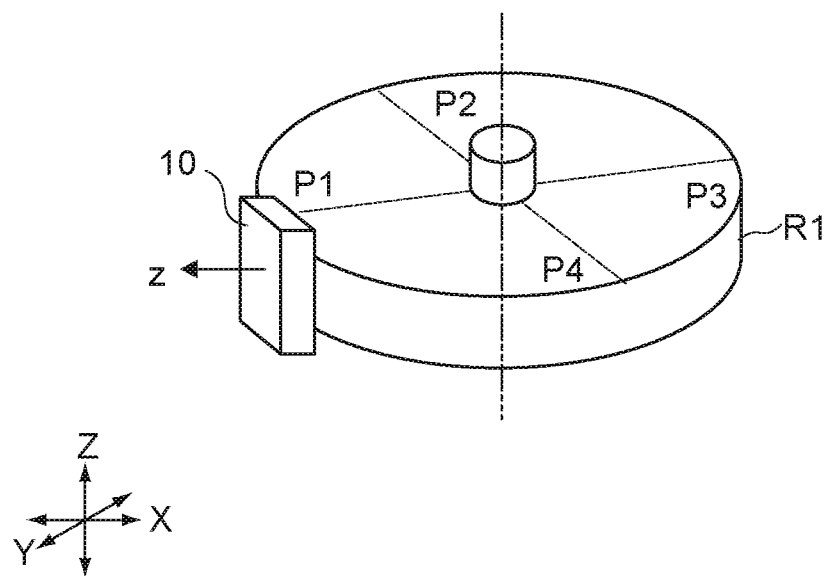
FIG. 8A is a schematic view showing an example of an acceleration that acts on the sensor element.
Figure 8B:
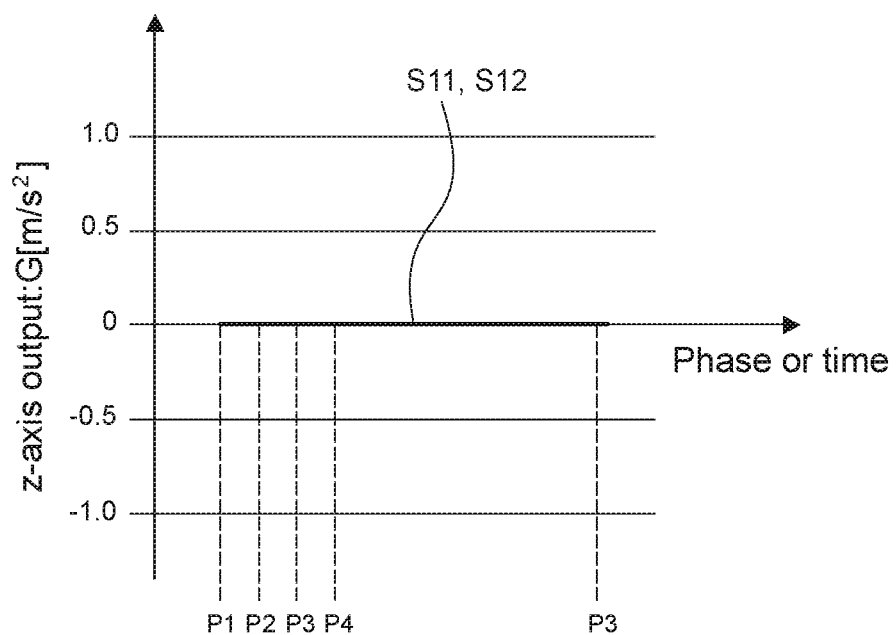
FIG. 8B is a diagram showing an example of a detection signal output from the sensor element in FIG. 8A.

The detection signals in the z-direction detection axis (Acc-AC-z, Acc-DC-z) of the sensor element 10 when the rotation shaft of the rotor R1 is disposed in parallel to the vertical axis as shown in FIG. 8A each becomes zero as shown in FIG. 8B. Also in this case, in the x-direction detection axis or the y-direction detection axis, a gravitational acceleration corresponding to the rotational position is detected.

(Case 4)

Figure 9A:
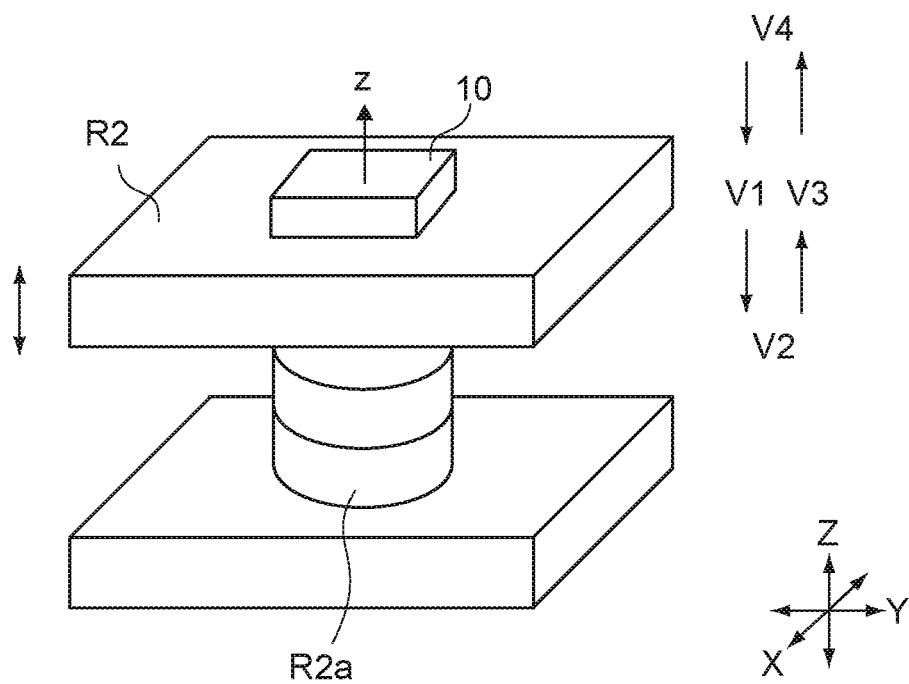
FIG. 9A is a schematic view showing an example of an acceleration that acts on the sensor element.
Figure 9B:
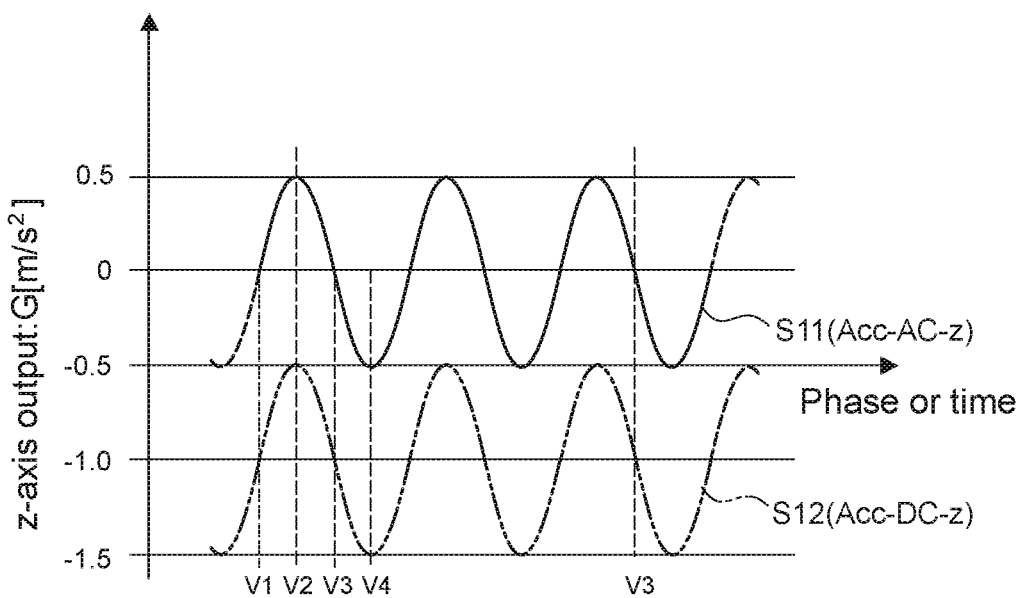
FIG. 9B is a diagram showing an example of a detection signal output from the sensor element in FIG. 9A.

Next, FIG. 9B shows an example of an output waveform in the z-direction detection axis of the sensor element 10 (first and second acceleration detector units 11 and 12) attached to, as shown in FIG. 9A, a vibration table R2 including a vibrator unit R2a that expands and contracts in the X-axis direction.

The sensor element 10 is attached to the upper surface of the vibration body R2, which is parallel to the XY plane, such that the z-direction detection axis is directed upward. Here, the upward direction in the figure is set as a gravity direction (see FIG. 9A). FIG. 9B shows each of a temporal change of a detection signal S11 output from the first acceleration detector unit 11 and a temporal change of a detection signal S12 output from the second acceleration detector unit 12, when the vibration table R2 is vibrated in the up-and-down direction. It should be noted that the vibration frequency of the vibration table R2 is set to an appropriate frequency (e.g., 1 Hz) at which the first acceleration detector unit 11 in the piezoelectric method can detect an acceleration.

Along with the vibration of the vibration table R2, the magnitude of the weight acceleration that acts on the z axis of the sensor element 10 periodically changes. In the first acceleration detector unit 11 in the piezoelectric method, the magnitude of the output varies depending on a vibration position of the vibration table (positions V1 to V4 in FIG. 9A), and the output becomes maximum at the bottom dead point (V2) and the top dead point (V4) of the vibration table R2. In the detection signal S11 (Acc-AC-z), a dynamic acceleration with a 1 G width (−0.5 G to 0.5 G) is detected in the example shown in the figure. In other words, the first acceleration detector unit 11 outputs the detection signal S11 having an alternating-current waveform corresponding to the vibration acceleration.

Meanwhile, also in the second acceleration detector unit 12 including the piezoresistive detection elements, similarly, the magnitude of the output varies depending on a vibration position of the vibration table, and the output becomes maximum at the bottom dead point (V2) and the top dead point (V4) of the vibration table R2. However, since the second acceleration detector unit 12 also detects a gravitational acceleration that is the static acceleration component at the same time, in the detection signal S12 (Acc-DC-z), a dynamic acceleration with a 1 G width (−1.5 G to −0.5 G) in which a base line is at −1 G is detected (see FIGS. 6B and 9B). In other words, the second acceleration detector unit 12 outputs the detection signal S12 having an output waveform in which an alternating-current component corresponding to the vibration acceleration is superimposed on a DC component (−1 G in this example).

(Case 5)

Figure 10A:
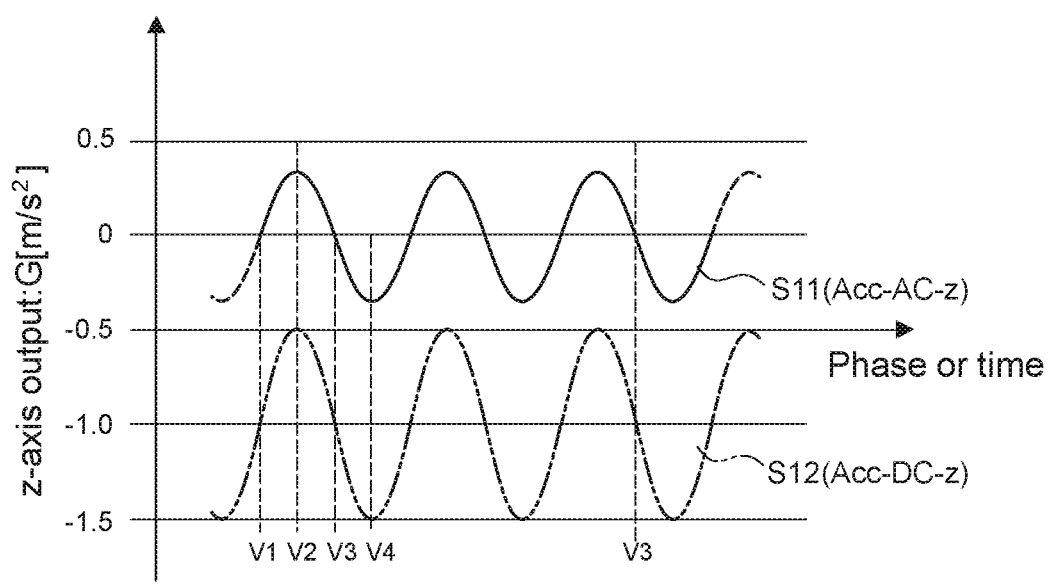
FIG. 10A is a diagram showing another example of a detection signal output from the sensor element in FIG. 9A.
Figure 10B:
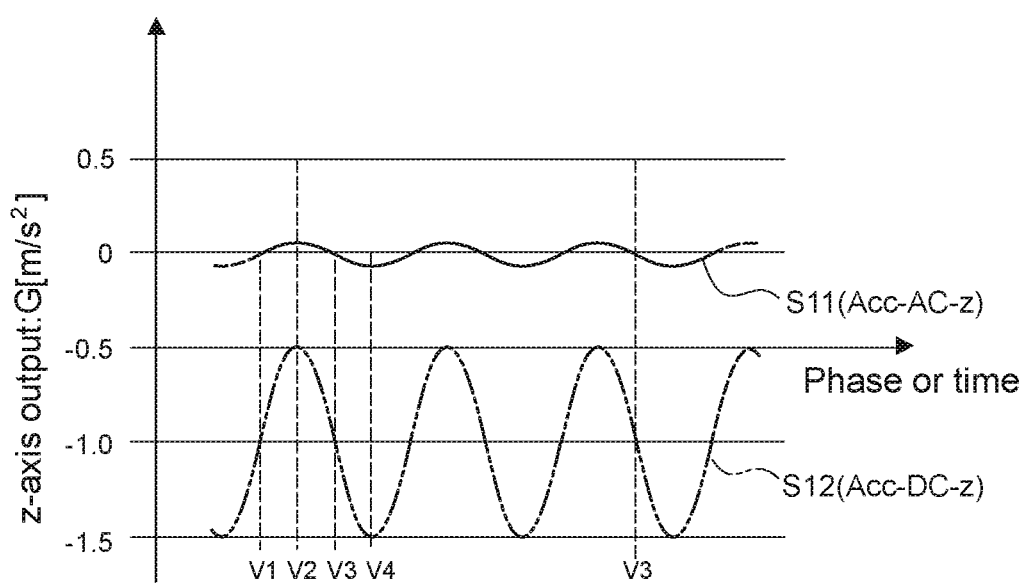
FIG. 10B is a diagram showing another example of a detection signal output from the sensor element in FIG. 9A.

Next, FIGS. 10A and 10B each show an output waveform of the sensor element 10 when the vibration frequency of the vibration table R2 is made smaller than that of Case 4. FIG. 10A shows an example when the vibration frequency is 0.05 Hz, and FIG. 10B shows an example when the vibration frequency is 0.01 Hz.

As shown in FIGS. 10A and 10B, the output of the detection signal S11 (Acc-AC-z) of the first acceleration detector unit 11 becomes smaller as the vibration frequency becomes lower. This is because the piezoelectric element constituting the first acceleration detector unit 11 functions as a high-pass filter having a cutoff frequency in the vicinity of a predetermined frequency (e.g., 0.5 Hz here) as will be described later. The detection sensitivity of an acceleration in a frequency range lower than the cutoff frequency tends to be lowered as compared to the detection sensitivity of an acceleration in the frequency range higher than the cutoff frequency. As compared to the output example of FIG. 9B, FIG. 10A shows a case where the sensitivity is approximately 70%, and FIG. 10B shows a case where the sensitivity is approximately 10%.

In contrast to this, regarding the detection signal S12 (Acc-DC-z) of the second acceleration detector unit 12, there is no decrease in output even in a case where the vibration frequency is lowered, and stable output sensitivity is ensured. Therefore, a relatively slow motion, posture change, or the like of the detection target can also relatively highly detected by the second acceleration detector unit 12. It should be noted that, as will be described later, the second acceleration detector unit 12 including the piezoresistive element has the following aspect: having a dynamic range narrower than that of the first acceleration detector unit 11 including the piezoelectric element, and thus being unfit for highly accurate detection of a relatively large motion of the detection target.

As described above, the first acceleration detector unit 11 of the piezoelectric type can detect a net motion acceleration (AC component) without the influence of the static acceleration component (DC component) such as a gravitational acceleration, but has the property in which sensitivity in a predetermined low-frequency range is reduced.

On the other hand, the second acceleration detector unit 12 of the piezoresistive type has an output waveform in which the motion acceleration of the detection target is superimposed on the gravity component, and thus has the property in which the separation from the gravitational acceleration is difficult to perform but constant output sensitivity can be obtained also in the low-frequency range.

The inertial sensor 1 of this embodiment includes the controller 20 capable of extracting the dynamic acceleration components and the static acceleration components from the accelerations that act on the sensor element 10, on the basis of those two detection signals S11 and S12. Hereinafter, details of the controller 20 will be described.

(Controller)

The controller 20 is electrically connected to the sensor element 10. The controller 20 may be mounted inside a device together with the sensor element 10 or may be mounted in an external device different from the above-mentioned device. In the former case, for example, the controller 20 may be mounted on a circuit board on which the sensor element 10 is to be mounted or may be mounted on a substrate different from the above-mentioned circuit board via a wiring cable or the like. In the latter case, for example, the controller 20 is configured to be communicable with the sensor element 10 wirelessly or wiredly.

As shown in FIG. 1, the controller 20 includes the acceleration arithmetic unit 200, a serial interface 201, a parallel interface 202, and an analog interface 203. The controller 20 is electrically connected to controller units of various devices that receive the output of the inertial sensor 1.

The acceleration arithmetic unit 200 extracts each of dynamic acceleration components (Acc-x, Acc-y, Acc-z) and static acceleration components (Gr-x, Gr-y, Gr-z) on the basis of the acceleration detection signals in the respective axial directions, which are output from the first acceleration detector unit 11 and the second acceleration detector unit 12.

It should be noted that the acceleration arithmetic unit 200 is achieved by loading a program, which is recorded in a ROM as an example of a non-transitory computer readable recording medium, to a RAM or the like and executing the program by the CPU.

The serial interface 201 is configured to be capable of sequentially outputting the dynamic and static acceleration components in the respective axes, which are generated in the acceleration arithmetic unit 200, to the controller units described above. The parallel interface 202 is configured to be capable of outputting the dynamic and static acceleration components in the respective axes, which are generated in the acceleration arithmetic unit 200, to the controller units described above in parallel. The controller 20 may include at least one of the serial interface 201 or the parallel interface 202 or may selectively switch the interface depending on commands from the controller units described above. The analog interface 203 is configured to be capable of outputting the outputs of the first and second acceleration detector units 11 and 12 to the controller units described above without change, but it may be omitted as necessary. It should be noted that FIG. 1 shows converters 201 that analog-digital (AD) convert the acceleration detection signals in the respective axes and are denoted by reference number 204.

Figure 11:
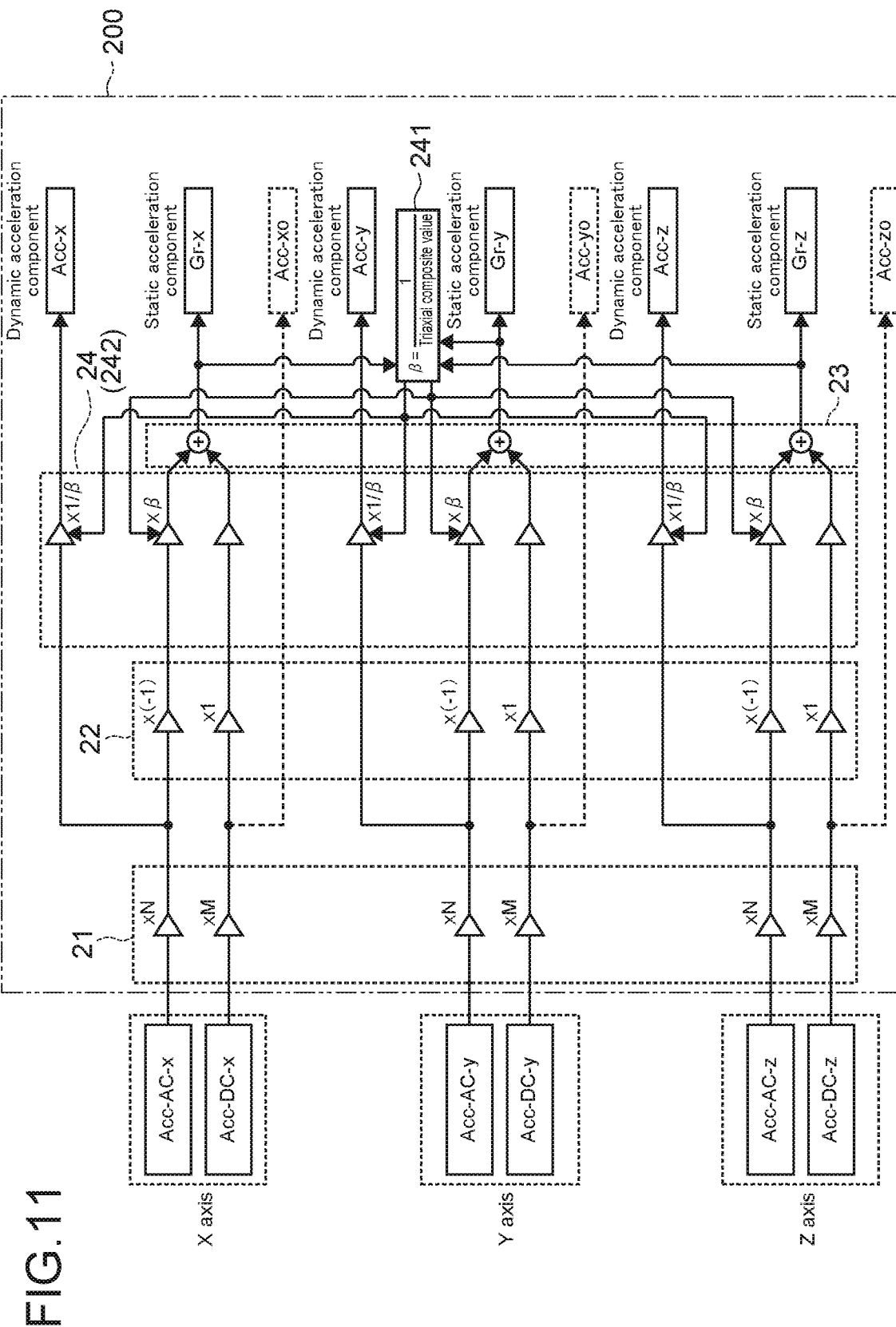
FIG. 11 is a circuit diagram showing a configuration example of the acceleration arithmetic unit in the inertial sensor.

FIG. 11 is a circuit diagram showing a configuration example of the acceleration arithmetic unit 200.

The acceleration arithmetic unit 200 includes a gain adjustment circuit 21, a sign inversion circuit 22, an adder circuit 23, and a correction circuit 24. Those circuits 21 to 24 have a common configuration for each of the x, y, and z axes. The arithmetic processing in common with the respective axes is performed, and the dynamic acceleration components (motion accelerations) and the static acceleration components (gravitational accelerations) in the respective axes are thus extracted.

Figure 12:
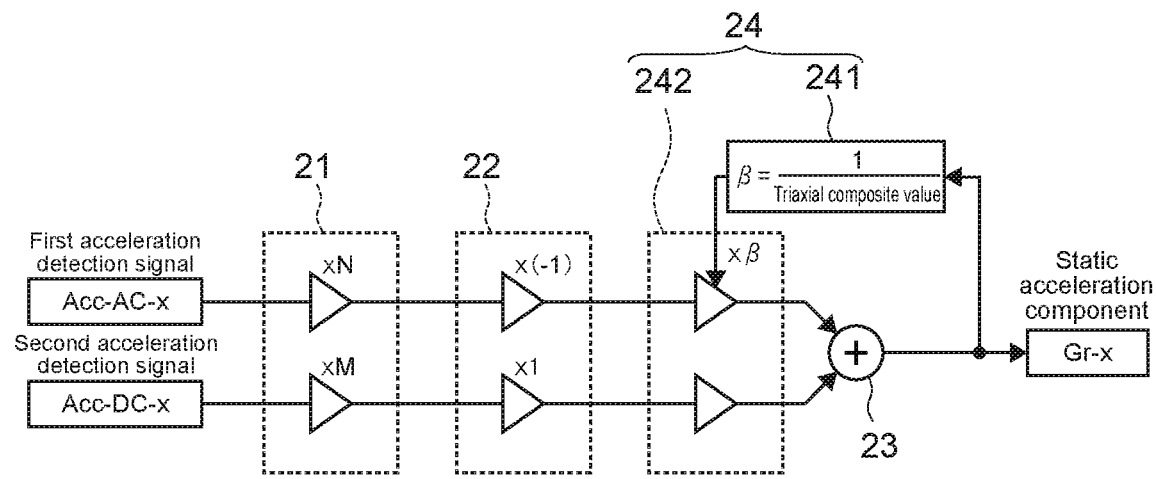
FIG. 12 is a diagram showing a processing block for a one-axis direction in the acceleration arithmetic unit.

Hereinafter, representatively, a processing circuit of the acceleration detection signal in the x-axis direction will be described as an example. FIG. 12 shows a processing block that extracts the static acceleration component from the acceleration detection signal in the x-axis direction.

The gain adjustment circuit 21 adjusts gain of each signal such that a first acceleration detection signal (Acc-AC-x) regarding the x-axis direction, which is output from the first acceleration detector unit 11 (11x1, 11x2), and a second acceleration detection signal (Acc-DC-x) regarding x-axis direction, which is output from the second acceleration detector unit 12 (12x1, 12x2), have a level identical to each other. The gain adjustment circuit 21 includes an amplifier that amplifies the output of the first acceleration detector unit 11 (Acc-AC-x) and the output of the second acceleration detector unit 12 (Acc-DC-x).

Figure 13:
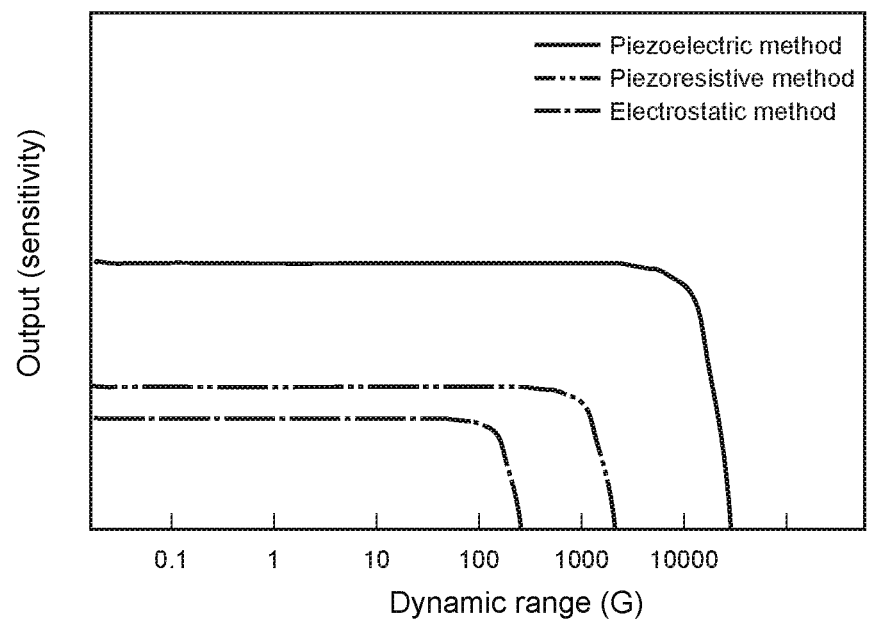
FIG. 13 is a diagram for describing output characteristics of a plurality of acceleration sensors in different detection methods.

In general, the output sensitivity and the dynamic range of an acceleration sensor are different depending on a detection method. For example, as shown in FIG. 13, an acceleration sensor in a piezoelectric method has higher output sensitivity and a wider (larger) dynamic range than those of acceleration sensors in a non-piezoelectric method (piezoresistive method, electrostatic method). In this embodiment, the first acceleration detector unit 11 corresponds to an acceleration sensor in a piezoelectric method, and the second acceleration detector unit 12 corresponds to an acceleration sensor in a piezoresistive method.

In this regard, the gain adjustment circuit 21 amplifies the outputs of the acceleration detector units 11 and (first and second acceleration detection signals) by N times and M times, respectively, such that the outputs of those acceleration detector units 11 and 12 have the identical level. The amplification factors N and M are positive numbers and satisfy a relationship where N<M. The values of the amplification factors N and M are not particularly limited and may be set as coefficients that also serve for the temperature compensation of the respective acceleration detector units 11 and 12, depending on an environment of usage (service temperature) of the inertial sensor 1.

Figure 14:
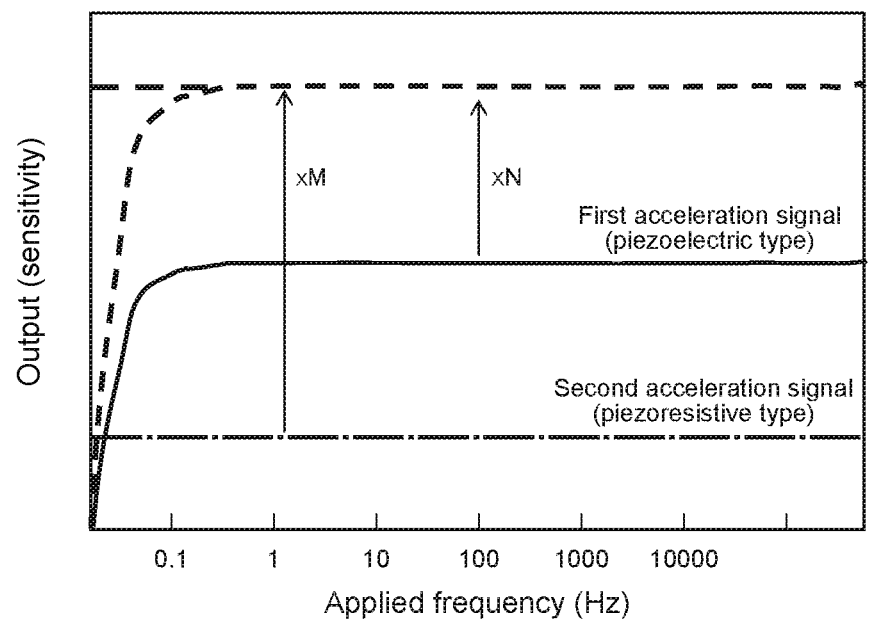
FIG. 14 is a diagram for describing an action of the acceleration arithmetic unit.

FIG. 14 shows an example of the output characteristics of the first acceleration detection signal and the second acceleration detection signal in comparison between the output characteristics before the gain adjustment and the output characteristics after the gain adjustment. In the figure, the horizontal axis represents the frequency of the acceleration that acts on the inertial sensor 1, and the vertical axis represents the output (sensitivity) (the same holds true for FIGS. 15 to 19).

As shown in the figure, in the first acceleration detection signal (Acc-AC-x) in the piezoelectric method, the output sensitivity of the acceleration components in the low-frequency range equal to or smaller than 0.5 Hz is lower than the output sensitivity of the acceleration components in the frequency range higher than the former range, and in particular, the output sensitivity in a static state (motion acceleration is zero) is substantially zero. In contrast to this, the second acceleration detection signal (Acc-DC-x) in the piezoresistive method has constant output sensitivity in the entire frequency range, and thus the acceleration component in the static state (i.e., static acceleration component) can also be detected at constant output sensitivity. Therefore, when the first acceleration detection signal and the second acceleration detection signal are amplified by respective predetermined multiplying factors in the gain adjustment circuit 21 so as to have a level identical to each other, the static acceleration component can be extracted in a difference arithmetic circuit to be described later.

The sign inversion circuit 22 and the adder circuit 23 constitute the difference arithmetic circuit that extracts the static acceleration component (DC component) from the acceleration in each axial direction on the basis of a difference signal between the first acceleration detection signal (Acc-AC-x) and the second acceleration detection signal (Acc-DC-x).

Figure 15:
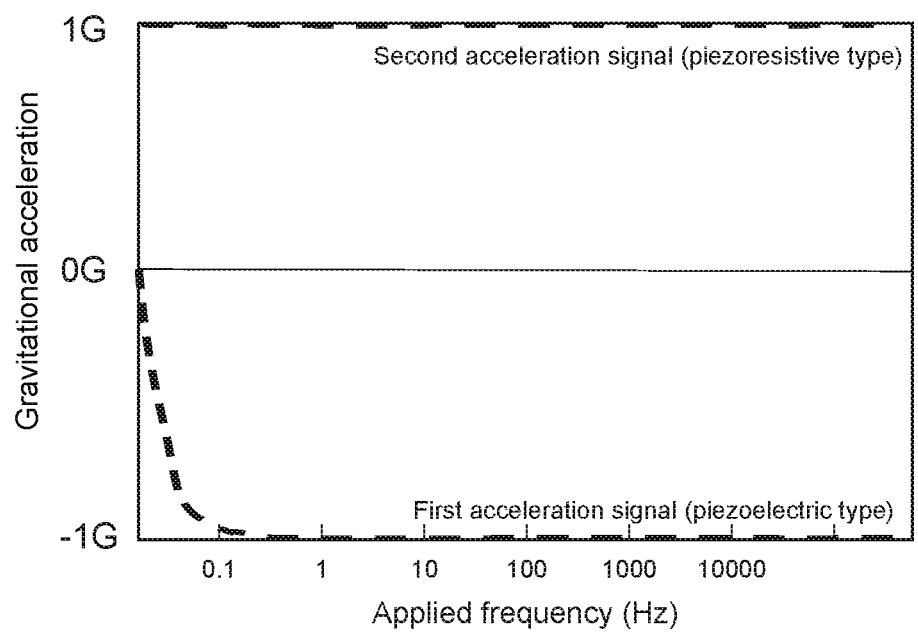
FIG. 15 is a diagram for describing an action of the acceleration arithmetic unit.

The sign inversion circuit 22 includes an inverting amplifier (amplification factor: −1) that inverts the sign of the first acceleration detection signal (Acc-AC-x) after the gain adjustment. FIG. 15 shows an example of the output characteristics of the first acceleration detection signal (Acc-AC-x) after the sign inversion. Here, a case where the sensor element 10 detects a 1G-acceleration in the x-axis direction is shown as an example.

It should be noted that the second acceleration detection signal (Acc-DC-x) is output to the adder circuit 23 as a subsequent stage, without inverting the sign thereof. The sign inversion circuit 22 may be configured in common with the gain adjustment circuit 21 at the previous stage thereof.

Figure 16:
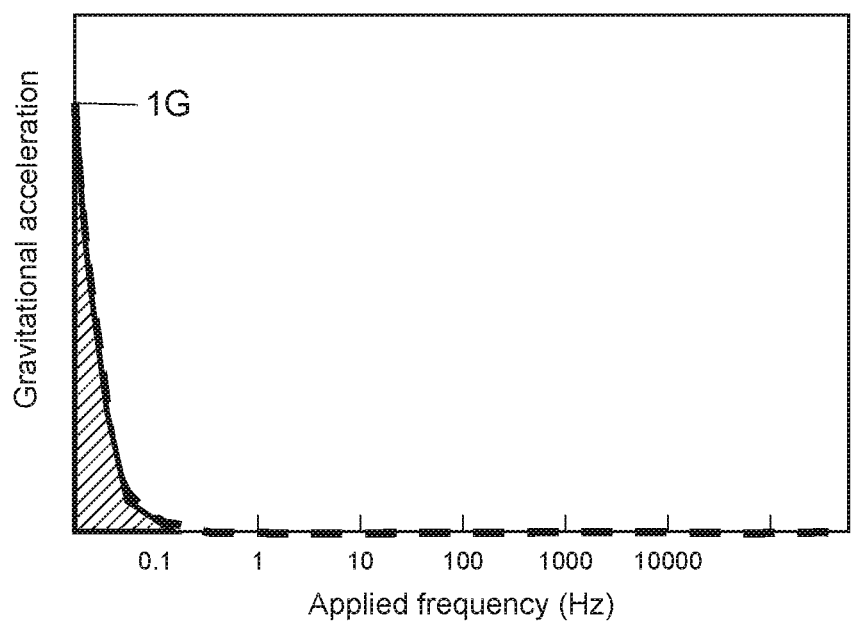
FIG. 16 is a diagram for describing an action of the acceleration arithmetic unit.

The adder circuit 23 adds the first acceleration detection signal (Acc-AC-x) and the second acceleration detection signal (Acc-DC-x), which are output from the sign inversion circuit 22, and outputs a static acceleration component. FIG. 16 shows an example of the output characteristics of the adder circuit 23. Since the first and second acceleration detection signals (outputs) are adjusted to have the identical level in the gain adjustment circuit 21, when a difference signal between those signals is obtained, a net static acceleration component (Gr-x) is extracted. The static acceleration component typically corresponds to a gravitational acceleration component or an acceleration component including a gravitational acceleration.

Figure 17:
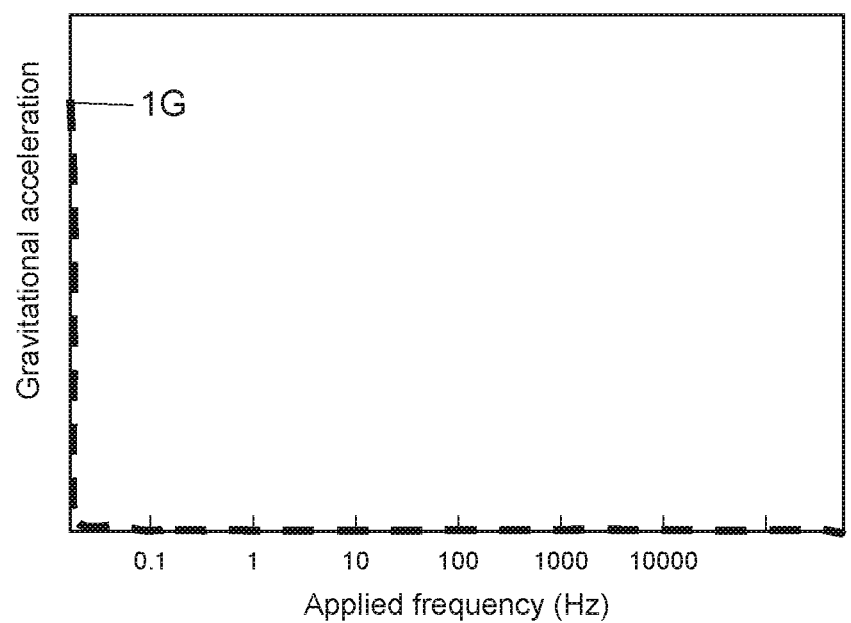
FIG. 17 is a diagram for describing an action of the acceleration arithmetic unit.

In a case where the static acceleration component output from the adder circuit 23 is only the gravitational acceleration, in theory, the output of a significant acceleration component appears only in the vicinity of 0 Hz as shown in FIG. 17. However, in reality, because of the low detection sensitivity in the vicinity of low frequencies of the piezoelectric-detection-type first acceleration detector unit 11, inevitable superimposition of acceleration components in axial directions (here, y-axis direction and z-axis direction) other than the target axis due to the occurrence of the sensitivity in the other axes, or the like, the dynamic acceleration component in the frequency range hatched in FIG. 16 leaks into the output of the adder circuit 23 as an error component. In this regard, this embodiment includes the correction circuit 24 for cancelling the error on the basis of the output of the adder circuit 23.

The correction circuit 24 includes a triaxial-composite-value arithmetic unit 241 and a low-frequency sensitivity correction unit 242. The correction circuit 24 calculates a correction coefficient β on the basis of the output of the adder circuit 23 (difference signal between first and second acceleration detection signals) and corrects the first acceleration detection signal (Acc-AC-x) by using the correction coefficient β.

The triaxial-composite-value arithmetic unit 241 is provided in common for the processing blocks that extract the static acceleration components in all the x-axis, y-axis, and z-axis directions, and calculates the correction coefficient β by using the total value of the outputs (difference signals between first and second acceleration detection signals) of the adder circuits 23 in the respective axes.

Specifically, the triaxial-composite-value arithmetic unit 241 calculates a composite value $(\sqrt{((Gr\text{-}x)^2+(Gr\text{-}y)^2+(Gr\text{-}z)^2)})$ of the static acceleration components in the three-axis directions (Gr-x, Gr-y, Gr-z), and while considering a portion exceeding 1 in the composite value as a low-frequency sensitivity error (range hatched in FIG. 16), calculates the correction coefficient β corresponding to the inverse of the composite value described above.

$$\beta = 1/(\sqrt{((Gr\text{-}x)^2+(Gr\text{-}y)^2+(Gr\text{-}z)^2)})$$

It should be noted that the values of the static acceleration components in the respective three-axis directions (Gr-x, Gr-y, Gr-z) differ depending on the posture of the sensor element 10 and further vary from hour to hour according to a change in posture of the sensor element 10. For example, in a case where the z-axis direction of the sensor element 10 coincides with the gravity direction (vertical direction), the static acceleration component (Gr-z) in the z-axis direction has a large value as compared to the static acceleration components (Gr-x, Gr-y) in the x-axis direction and the y-axis direction. In such a manner, the gravity direction of the sensor element 10 at that point of time can be estimated from the values of the static acceleration components (Gr-x, Gr-y, Gr-z) in the respective three-axis directions.

The low-frequency sensitivity correction unit 242 includes a multiplier that multiplies the first acceleration detection signal (Acc-AC-x) having the inverted sign by the correction coefficient β. With this configuration, the first acceleration detection signal is input to the adder circuit 23 in a state where a low-frequency sensitivity error is reduced, and thus an acceleration signal having the frequency characteristics as shown in FIG. 17 is output from the adder circuit 23. In such a manner, only the static acceleration component corresponding to the gravitational acceleration is output, with the result that the extraction accuracy of the gravitational acceleration component is improved.

In this embodiment, the correction circuit 24 is configured to execute processing of multiplying the first acceleration detection signal by the correction coefficient β, when the static acceleration component is calculated, but the present technology is not limited thereto. The correction circuit 24 may be configured to execute processing of multiplying the second acceleration detection signal (Acc-DC-x) by the correction coefficient β, or may be configured to switch an acceleration detection signal to be corrected between the first acceleration detection signal and the second acceleration detection signal according to the magnitude of an acceleration change.

In a case where either one of the first acceleration detection signal and the second acceleration detection signal has a predetermined acceleration change or larger, the correction circuit 24 is configured to correct the first acceleration detection signal by using the correction coefficient β. As the acceleration change becomes larger (as a frequency to be applied becomes higher), a proportion at which the error component leaks into the first acceleration detection signal increases, and thus the error component can be effectively reduced. This configuration is particularly effective in a case where the motion acceleration is relatively large, for example, as in a motion analysis application.

Meanwhile, in a case where either one of the first acceleration detection signal and the second acceleration detection signal has a predetermined acceleration change or smaller, the correction circuit 24 is configured to correct the second acceleration detection signal by using the correction coefficient β. As the acceleration change becomes smaller (as a frequency to be applied becomes lower), a proportion at which the error component leaks into the second acceleration detection signal increases, and thus the error component can be effectively reduced. This configuration is particularly effective in a case where the motion acceleration is relatively small, for example, as in a leveling operation of a digital camera.

While the static acceleration components in the respective axial directions are extracted as described above, in order to extract the dynamic acceleration components in the respective axial directions (Acc-x, Acc-y, Acc-z), the first acceleration detection signals (Acc-AC-x, Acc-AC-y, Acc-AC-z), in each of which gain is adjusted in the gain adjustment circuit 21, are referred to as shown in FIG. 11.

Here, the first acceleration detection signal may be used to extract the dynamic acceleration component as it is. However, since there is a case where part of the dynamic acceleration component leaks into the static acceleration component as described above, the dynamic acceleration component is lost and the detection with high accuracy is difficult to perform. In this regard, the first acceleration detection signal is corrected by using the correction coefficient $\beta$, calculated in the correction circuit 24, so that the detection accuracy of the dynamic acceleration component can be achieved.

Figure 18:
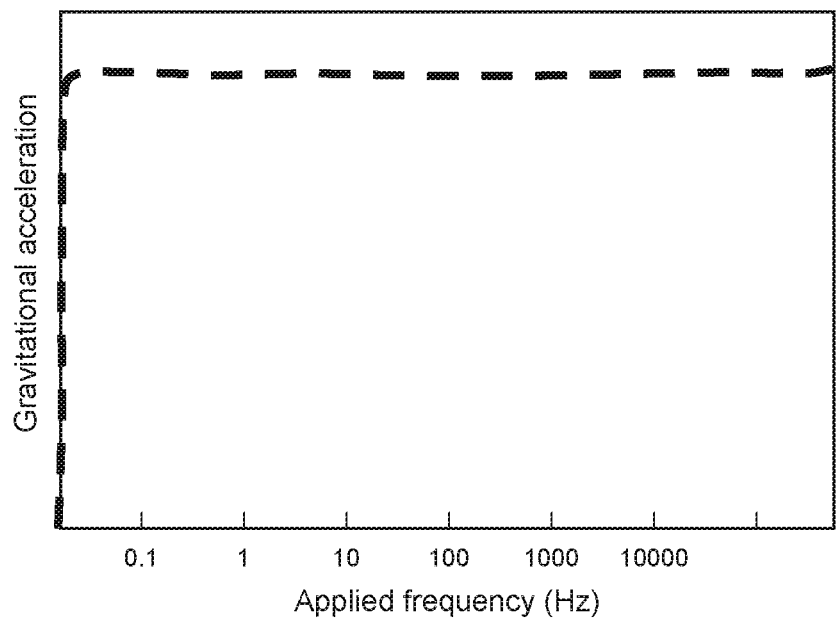
FIG. 18 is a diagram for describing an action of the acceleration arithmetic unit.
Figure 19:
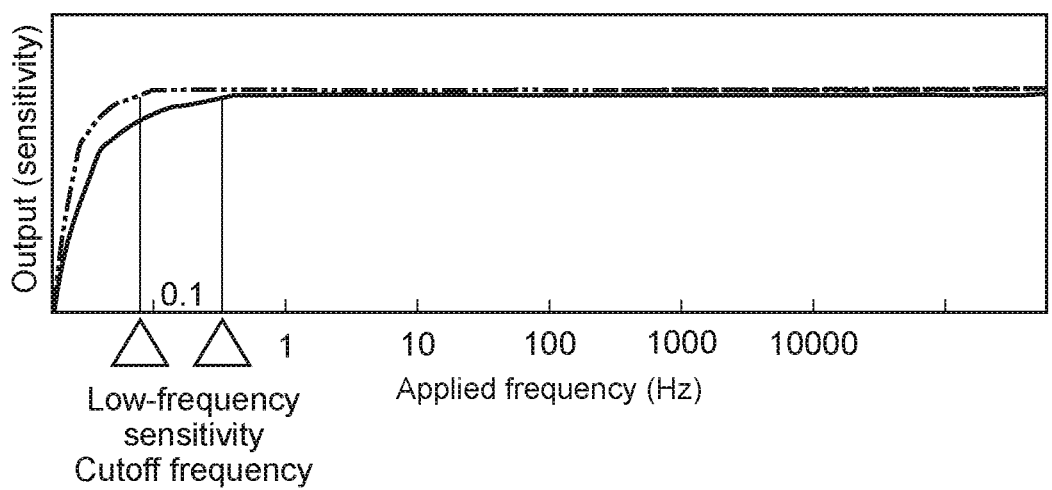
FIG. 19 is a diagram for describing an action of the acceleration arithmetic unit.

More specifically, as shown in FIG. 11, the correction circuit 24 (low-frequency sensitivity correction unit 242) includes a multiplier that multiplies the first acceleration signals (Acc-AC-x, Acc-AC-y, Acc-AC-z) by the inverse ($1/\beta$) of the correction coefficient $\beta$, which is acquired by the triaxial-composite-value arithmetic unit 241. With this configuration, low-frequency sensitivity components of the first acceleration signals are compensated, and thus the extraction accuracy of the dynamic acceleration components (Acc-x, Acc-y, Acc-z) is improved. FIG. 18 schematically shows the output characteristics of the dynamic acceleration components.

In this embodiment, the correction circuit 24 is configured to execute processing of multiplying the first acceleration detection signal by the inverse ($1/\beta$) of the correction coefficient when the dynamic acceleration component is calculated, but the present technology is not limited thereto. The correction circuit 24 may be configured to execute processing of multiplying the second acceleration detection signals (Acc-DC-x, Acc-DC-y, Acc-DC-z) by the inverse ($1/\beta$) of the correction coefficient. Alternatively, the correction circuit 24 may be configured to switch an acceleration detection signal to be corrected between the first acceleration detection signal and the second acceleration detection signal according to the magnitude of an acceleration change, as in the case of the above-mentioned calculation technique for the static acceleration components.

The processing of correcting the dynamic acceleration component and the static acceleration component by the low-frequency sensitivity correction unit 242 is typically effective in a case where a composite value calculated in the triaxial-composite-value arithmetic unit 241 is other than 1 G (G: gravitational acceleration). It should be noted that examples of the case where the composite value described above is less than 1 G include a case where the sensor element 10 is in free fall.

It should be noted that the first acceleration detection signal detected by the piezoelectric method has output characteristics like a high-pass filter (HPF), and the output lower than a cutoff frequency thereof remains in the output of the adder circuit 23 as an error component of the low-frequency sensitivity (see FIG. 16). In this embodiment, the error component described above is reduced by an arithmetic technique using the correction circuit 24, but the lower cutoff frequency described above is more desirable in order to enhance the accuracy of cancelling the error component.

In this regard, for example, a piezoelectric body having a relatively large capacitance and internal resistance may be used as the piezoelectric film of each of the detection elements (11$x$1, 11$x$2, 11$y$1, 11$y$2) constituting the first acceleration detector unit 11. With this configuration, for example, as indicated by a chain line in FIG. 19, the cutoff frequency of the low-frequency sensitivity can be reduced to the vicinity of 0 Hz as much as possible, so that the error component of the low-frequency sensitivity can be made as small as possible.

[Acceleration Measurement Method]

Next, the method of processing the acceleration signal in the acceleration arithmetic unit 200 configured as described above will be described.

When an acceleration acts on the sensor element 10, the movable plate 120 moves according to the direction of the acceleration with respect to the base portion 115 in the states shown in FIGS. 5A, 5B, and 5C. The first acceleration detector unit 11 (detection elements 11$x$1, 11$x$2, 11$y$1, 11$y$2) and the second acceleration detector unit 12 (detection elements 12$x$1, 12$x$2, 12$y$1, 12$y$2) output detection signals corresponding to the amounts of mechanical deformation of the bridge portions 131 to 134 to the controller 20.

Figure 20:
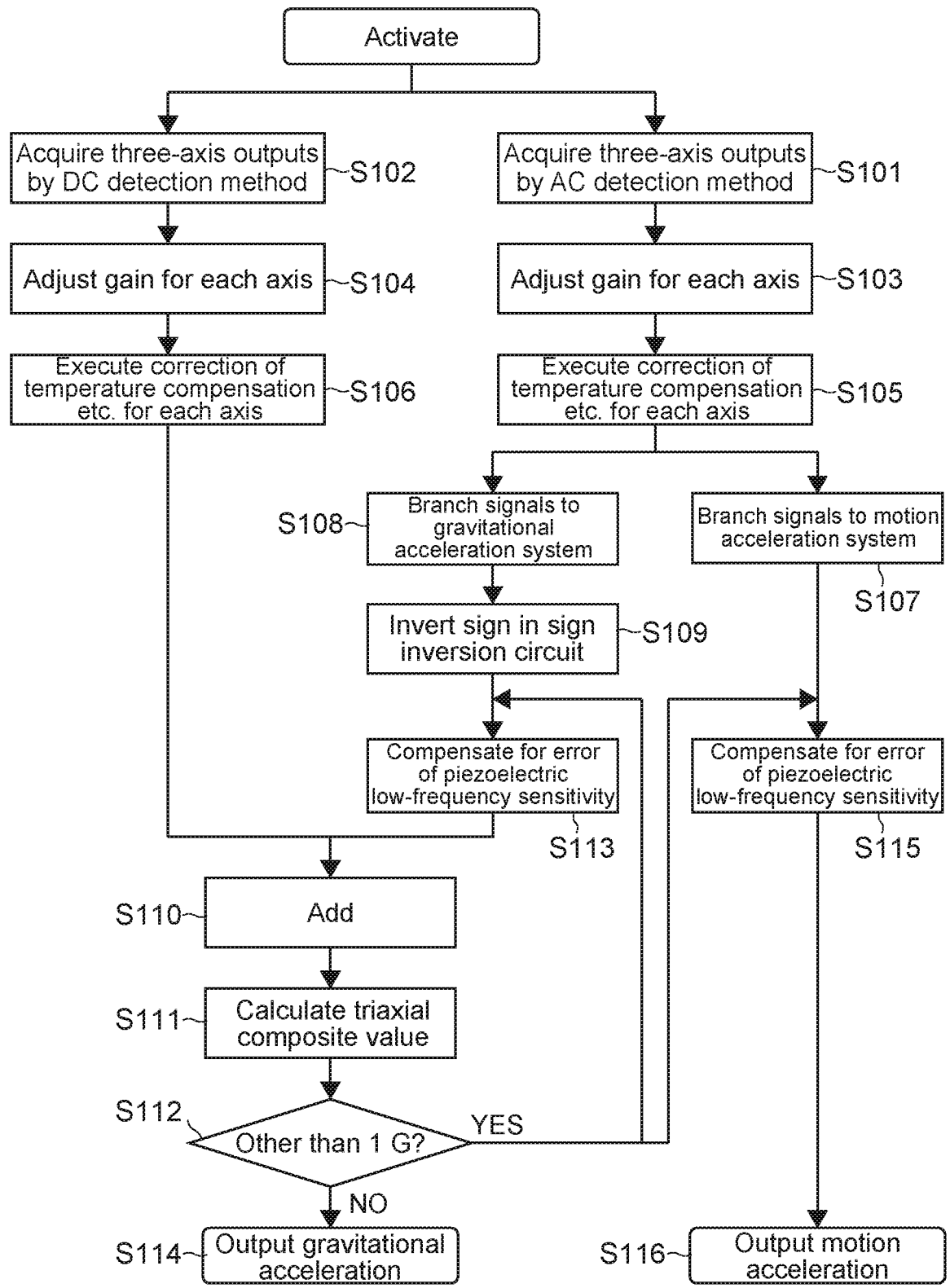
FIG. 20 is a flowchart showing an example of a processing procedure of the acceleration arithmetic unit.

FIG. 20 is a flowchart showing an example of the processing procedure of the acceleration detection signal in the controller 20 (acceleration arithmetic unit 200).

The controller 20 acquires the first acceleration detection signals in the respective axes (Acc-AC-x, Acc-AC-y, Acc-AC-z) from the first acceleration detector unit 11 and receives (acquires) the second acceleration detection signals in the respective axes (Acc-DC-x, Acc-DC-y, Acc-DC-z) from the second acceleration detector unit 12 at predetermined sampling intervals (Steps 101 and 102). Those detection signals may be acquired simultaneously (in parallel) or sequentially (serially).

Sequentially, the controller 20 adjusts gain of each detection signal by the gain adjustment circuit 21 such that the first and second acceleration detection signals have an identical level for each axis (FIG. 14, Steps 103 and 104). Further, as necessary, correction for the purpose of temperature compensation or the like of the first and second acceleration detection signals is performed for each axis (Steps 105 and 106).

Next, the controller 20 branches the first acceleration detection signals in the respective axes (Acc-AC-x, Acc-AC-y, Acc-AC-z) into a dynamic acceleration calculation system (motion acceleration system) and a static acceleration calculation system (gravitational acceleration system) (Steps 107 and 108). The first acceleration detection signal branched to the static acceleration calculation system is input to the adder circuit 23 after the sign thereof is inverted by the sign inversion circuit 22 (FIG. 15, Step 109).

The controller 20 adds the first acceleration detection signals (Acc-AC-x, Acc-AC-y, Acc-AC-z) whose signs are inverted, and the second acceleration detection signals (Acc-DC-x, Acc-DC-y, Acc-DC-z), and calculates static acceleration components (Gr-x, Gr-y, Gr-z) for the respective axes in the adder circuit 23 (FIG. 16, Step 110). Furthermore, the controller 20 calculates a triaxial composite value of those static acceleration components in the triaxial-composite-value arithmetic unit 241 (Step 111) and, in a case where that value is other than 1 G, executes in the low-frequency sensitivity correction unit 242 processing of multiplying the above-mentioned first acceleration detection signals (Acc- AC-x, Acc-AC-y, Acc-AC-z) whose signs are inverted, by the correction coefficient β, that is the inverse of the composite value described above (Steps 112 and 113). When the composite value described above is 1 G, the controller 20 outputs the calculated gravitational acceleration components (static acceleration components) to the outside (Step 114). It should be noted that the present technology is not limited to the above, and each time the composite value described above is calculated, the calculated gravitational acceleration components (static acceleration components) may be output to the outside.

Meanwhile, when the composite value described above is other than 1 G, the controller 20 executes the processing of multiplying the first acceleration detection signals (Acc-AC-x, Acc-AC-y, Acc-AC-z), which are branched to the motion acceleration system, by the inverse (1/β) of the calculated correction coefficient β, (Steps 112 and 115). When the composite value described above is 1 G, the controller 20 outputs the calculated motion acceleration components (dynamic acceleration components) to the outside (Step 116). It should be noted that the present technology is not limited to the above, and each time the composite value described above is calculated, the calculated motion acceleration components (dynamic acceleration components) may be output to the outside.

As described above, the inertial sensor 1 in this embodiment is configured to use the difference in detection methods for the first and second acceleration detector units 11 and 12 to extract the dynamic acceleration components and the static acceleration components from those outputs. With this configuration, the motion acceleration that acts on an object (detection target of electronic apparatus or the like) can be accurately measured.

Further, according to this embodiment, since the gravitational acceleration components can be accurately extracted from the output of the inertial sensor 1, the posture of the detection target with respect to the gravity direction can be highly accurately detected. With this configuration, for example, the horizontal posture of a detection target such as a flight vehicle can be stably maintained.

Furthermore, according to this embodiment, since a piezoelectric acceleration sensor is employed as the first acceleration detector unit 11, and a non-piezoelectric (piezoresistive or electrostatic) acceleration sensor is employed as the second acceleration detector unit 12, an inertial sensor having a wide dynamic range and high sensitivity in a low-frequency range can be obtained.

Second Embodiment

Figure 21:
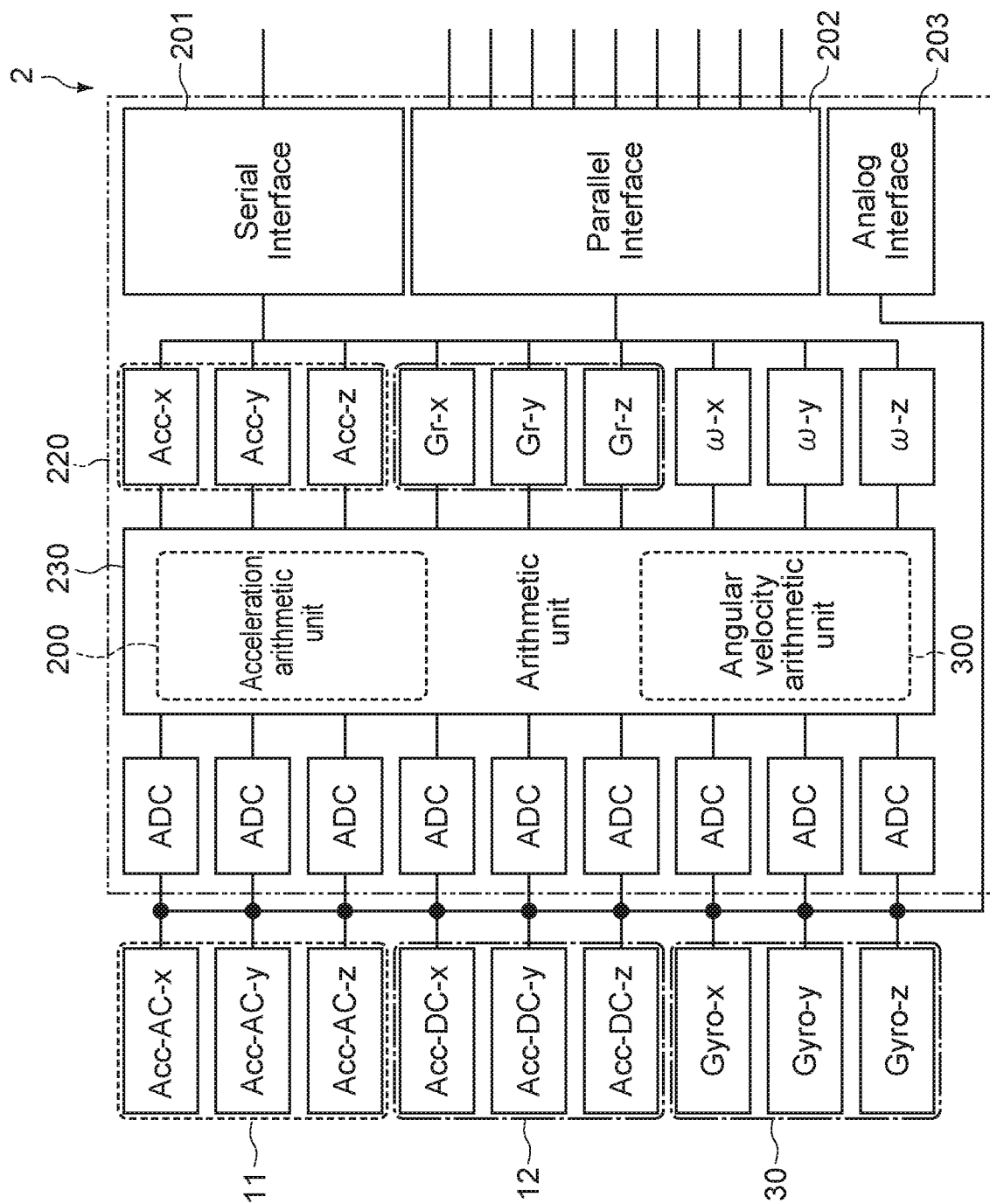
FIG. 21 is a block diagram showing a configuration of an inertial sensor according to another embodiment of the present technology.

FIG. 21 is a block diagram showing a configuration of an inertial sensor according to a second embodiment of the present technology. Hereinafter, a configuration different from that of the first embodiment will be mainly described, and a configuration similar to that of the first embodiment will be denoted by a similar reference symbol and the description thereof will be omitted or simply described.

An inertial sensor 2 of this embodiment includes first and second acceleration detector units 11 and 12, an angular velocity detector unit 30, and an controller 220. The angular velocity detector unit 30 outputs three-axis angular velocity detection signals (third detection signals) including information related to the angular velocities about the three axes, i.e., the x axis, the y axis, and the z axis. The controller 220 is different from that of the first embodiment in including, in addition to the acceleration arithmetic unit 200, an angular velocity arithmetic unit 300 that calculates angular velocities about the three axes on the basis of the three-axis angular velocity detection signals.

The angular velocity detector unit 30 may be constituted of a single, triaxial-integrated sensor element capable of detecting the angular velocities about the three axes or may be constituted of a plurality of uniaxial or biaxial-integrated sensor elements in combination. The angular velocity arithmetic unit 300 calculates angular velocity signals about the three axes (ω-x, ω-y, ω-z) on the basis of the angular velocity detection signals about the three axes (Gyro-x, Gyro-y, Gyro-z), respectively, and outputs those signals to the outside via the serial interface 201, the parallel interface 202, or the analog interface 203. The angular velocity arithmetic unit 300 may be constituted separately from the acceleration arithmetic unit 200 or may be constituted of the arithmetic unit 230 in common with the acceleration arithmetic unit 200.

According to this embodiment, it is possible to detect not only the accelerations in the three-axis directions but also the angular velocities about the three axes. With this configuration, it is possible to simultaneously refer to the acceleration information and the angular velocity information and achieve further improvement in the detection accuracy of a motion, a posture, a position, or the like of a detection target.

For example, by combining the motion acceleration information calculated in the acceleration arithmetic unit 200 and the angular velocity information calculated in the angular velocity arithmetic unit 300, it is possible to calculate the radius of rotation or the rotation center of the detection target (see Japanese Patent No. 5407863).

Third Embodiment

Figure 22:
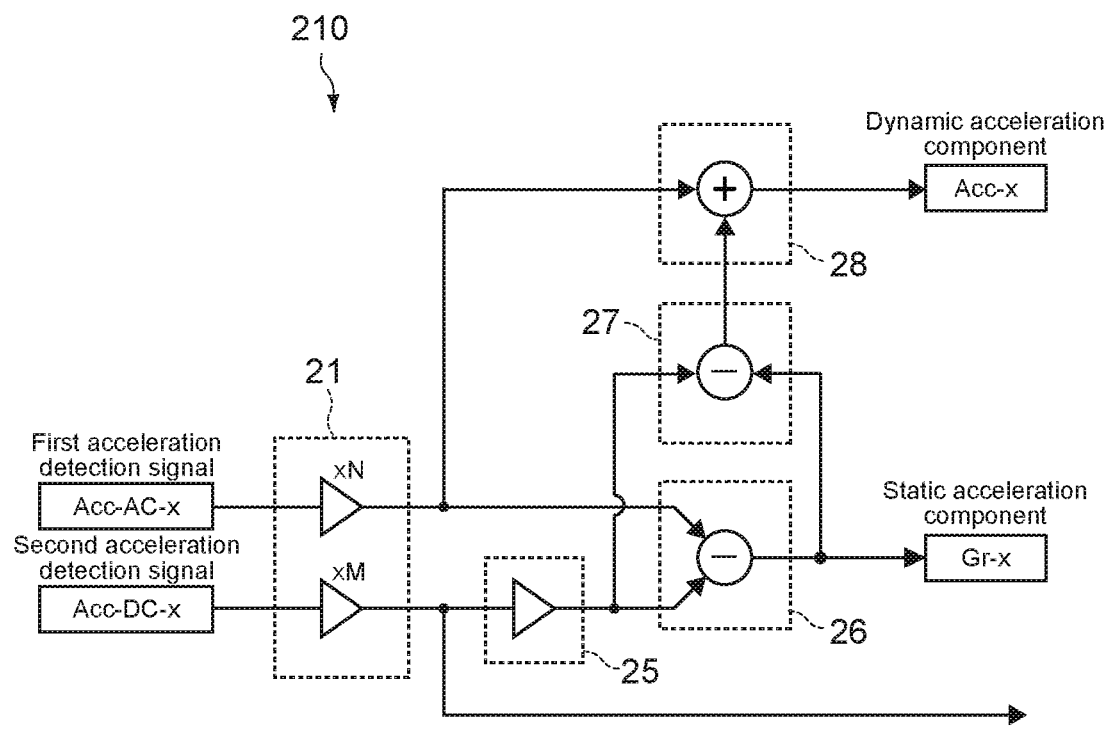
FIG. 22 is a circuit diagram showing a configuration example of an acceleration arithmetic unit in an inertial sensor according to another embodiment of the present technology.

Subsequently, a third embodiment of the present technology will be described. FIG. 22 is a circuit diagram showing a configuration example of an acceleration arithmetic unit 210 according to this embodiment. Here, the processing block for the x-axis direction is shown, but the processing blocks for the y-axis direction and the z-axis direction are also constituted of similar circuits, though not shown in the figure.

The acceleration arithmetic unit 210 of this embodiment includes a gain adjustment circuit 21, a low-pass filter 25, a first subtracter 26, a second subtracter 27, and an adder 28. The acceleration arithmetic unit 210 is configured so as to cancel an error component of the low-frequency sensitivity for each of the axes.

As in the first embodiment, the gain adjustment circuit 21 adjusts gain of each signal such that the first acceleration detection signal (Acc-AC-x) and the second acceleration detection signal (Acc-DC-x) have an identical level (see FIG. 14).

Figure 23:
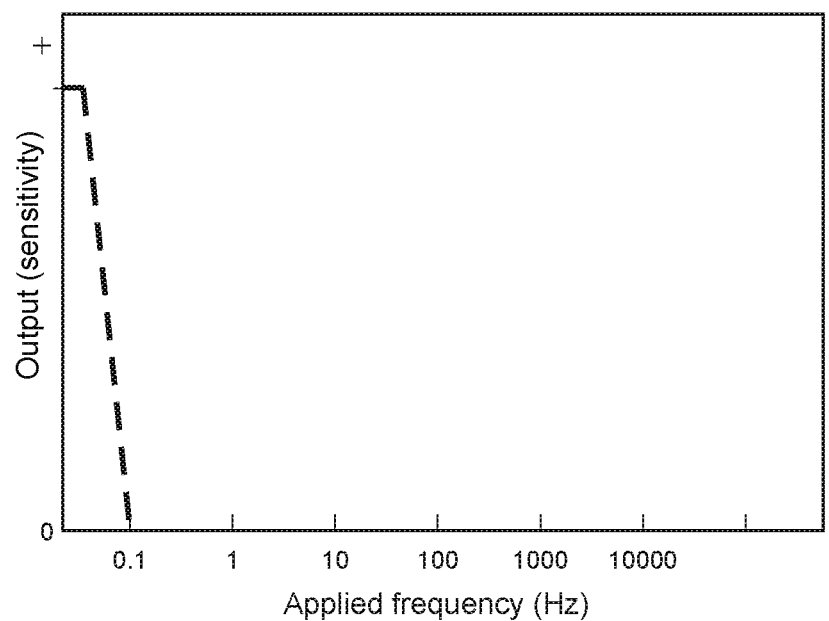
FIG. 23 is a diagram for describing an action of the acceleration arithmetic unit.

The low-pass filter 25 is set to have a cutoff frequency capable of causing an acceleration component of, for example, 0.1 Hz or smaller, to pass therethrough. The cutoff frequency of the low-pass filter 25 is typically set to a cutoff frequency of the piezoelectric element constituting the first acceleration detector unit 11 or a frequency lower than that cutoff frequency. The low-pass filter 25 outputs, out of the gain-adjusted second acceleration detection signal (Acc-DC-x), a low-frequency component including a direct-current component such as a gravitational acceleration. FIG. 23 schematically shows an example of an output signal of the low-pass filter 25.

Figure 24:
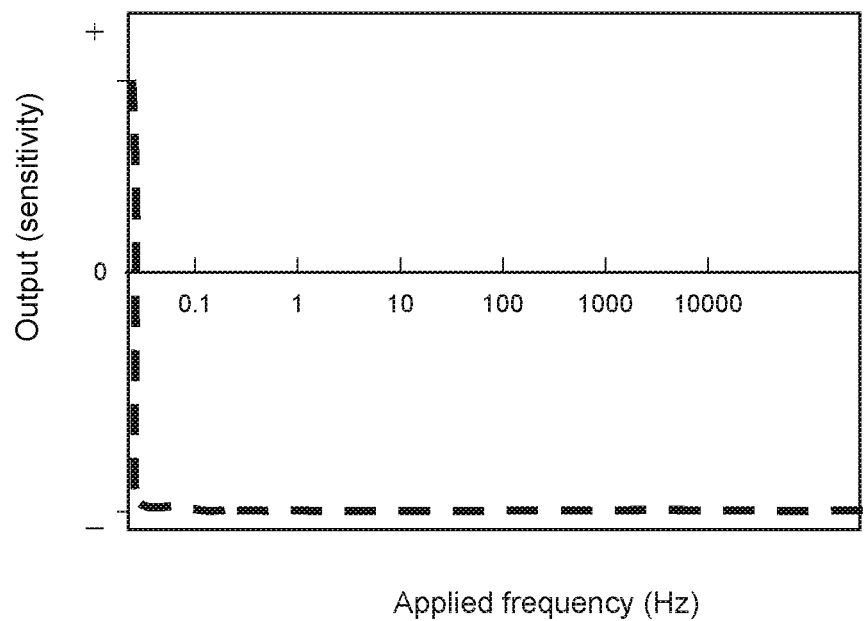
FIG. 24 is a diagram for describing an action of the acceleration arithmetic unit.
Figure 25:
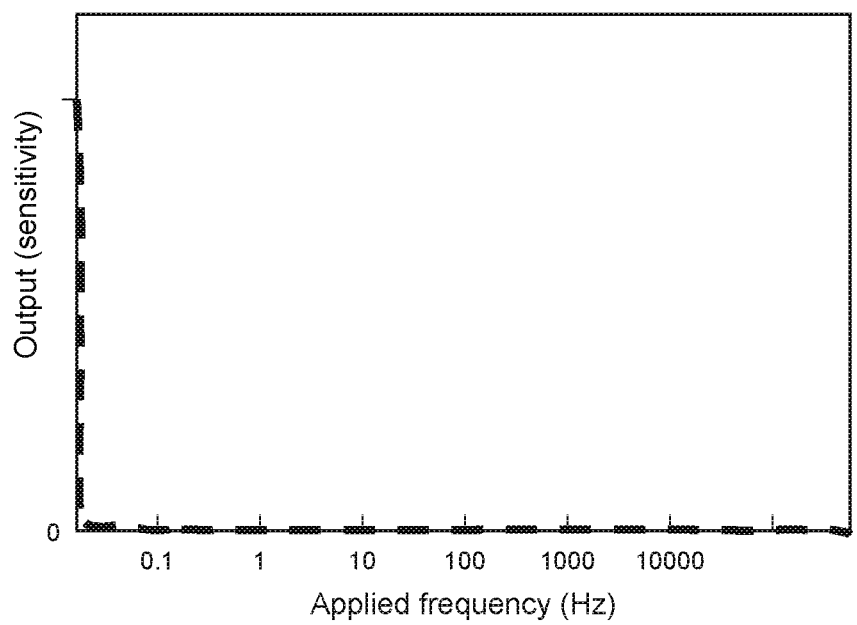
FIG. 25 is a diagram for describing an action of the acceleration arithmetic unit.

The first subtracter 26 calculates a difference between the gain-adjusted first detection signal (Acc-AC-x) and the output signal of the low-pass filter 25. In this example, the polarity of the first detection signal is inverted, and the resultant first detection signal is added to the output of the low-pass filter 25. With this configuration, an acceleration signal having the output characteristics as schematically shown in FIG. 24 is obtained. The first subtracter 26 converts the acceleration signal, which is obtained by the calculation of the difference, into a signal whose polarity is removed as shown in FIG. 25, and then outputs the resultant signal as a static acceleration component (Gr-x). This signal corresponds to a net gravitational acceleration component detected in the x-direction detection axis of the sensor element.

Figure 26:
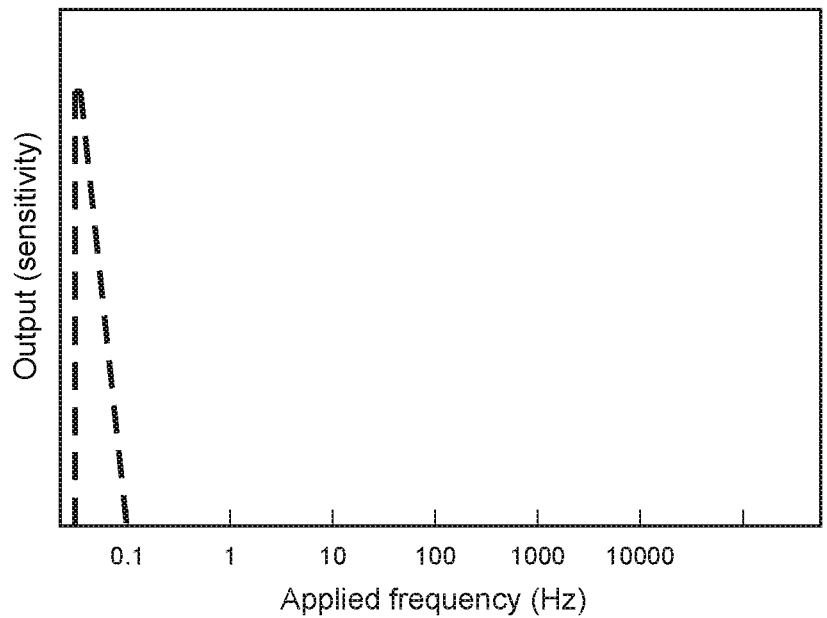
FIG. 26 is a diagram for describing an action of the acceleration arithmetic unit.

Meanwhile, the second subtracter 27 calculates a difference between the output signal of the low-pass filter 25 and the output signal of the first subtracter 26. With this configuration, as schematically shown in FIG. 26, output characteristics from which the net gravitational acceleration component is removed is obtained from the second acceleration detection signal (Acc-DC-x) that passes through the low-pass filter 25.

Figure 27:
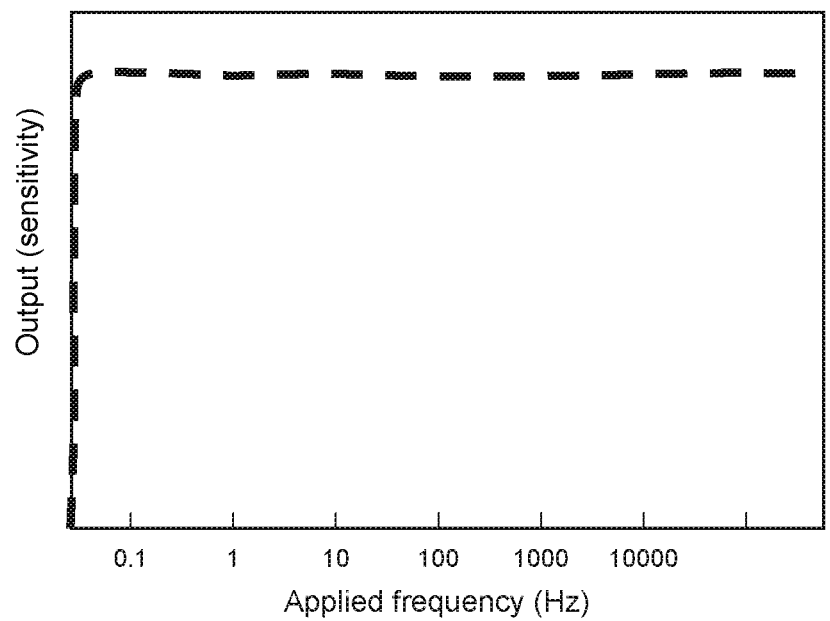
FIG. 27 is a diagram for describing an action of the acceleration arithmetic unit.

The adder 28 adds the gain-adjusted first detection signal (Acc-AC-x) and the output signal of the second subtracter 27. With this configuration, an acceleration signal having output characteristics as schematically shown in FIG. 27 is obtained. In other words, the adder 28 outputs, as a dynamic acceleration component (Acc_x), a signal in which the low-frequency range of the first acceleration detection signal (Acc-AC-x) is corrected by the output of the second subtracter 27. This signal corresponds to a net motion acceleration component detected in the x-direction detection axis of the sensor element.

As described above, the action and effect similar to those of the first embodiment described above can be obtained also in this embodiment. In particular, according to this embodiment, the low-frequency sensitivity of the dynamic acceleration components and the static acceleration components can be corrected for each of the axes, and thus it is possible to achieve simplification of the circuit configuration or reduction in calculation load.

Modified Example

In the above embodiments, the sensor element 10 shown in FIGS. 2 to 4 is used as a sensor element, but the configuration is not particularly limited as long as the sensor element can detect the accelerations in the three-axis directions.

Further, in the above embodiments, the example of FIG. 6 has been described as an arithmetic circuit that extracts the dynamic acceleration components and the static acceleration components from the accelerations in the three-axis directions, but the calculation method is not limited thereto and can be appropriately changed.

Furthermore, in the above embodiments, the dynamic acceleration components and the static acceleration components are extracted by using both of the first acceleration detector unit 11 of the piezoelectric type and the second acceleration detector unit 12 of the non-piezoelectric type, but both the acceleration detector units 11 and 12 may be differently used to acquire the dynamic acceleration components or the static acceleration components depending on a state of a motion of the detection target. For example, in a case where the motion of the detection target is relatively small, the static acceleration components may be calculated on the basis of a detection signal of the second acceleration detector unit of the non-piezoelectric type, and the dynamic acceleration components may be calculated on the basis of a detection signal of the first acceleration detector unit of the piezoelectric type.

It should be noted that the present technology can also have the following configurations.

(1) A signal processing apparatus, including
an acceleration arithmetic unit that extracts, on a basis of a first detection signal and a second detection signal, the first detection signal including information related to an acceleration along at least a uniaxial direction and having an alternating-current waveform corresponding to the acceleration, the second detection signal including the information related to the acceleration and having an output waveform in which an alternating-current component corresponding to the acceleration is superimposed on a direct-current component, a dynamic acceleration component and a static acceleration component from the acceleration.

(2) The signal processing apparatus according to (1), in which
each of the first detection signal and the second detection signal further includes information related to accelerations in multiaxial directions including the uniaxial direction, and
the acceleration arithmetic unit extracts the dynamic acceleration component and the static acceleration component for each of the multiaxial directions.

(3) The signal processing apparatus according to (1) or (2), in which
the acceleration arithmetic unit includes an arithmetic circuit that extracts the static acceleration component from the acceleration on a basis of a difference signal between the first detection signal and the second detection signal.

(4) The signal processing apparatus according to (3), in which
the acceleration arithmetic unit further includes a gain adjustment circuit that adjusts gain of each signal such that the first detection signal and the second detection signal have an identical level.

(5) The signal processing apparatus according to (3) or (4), in which
the acceleration arithmetic unit further includes a correction circuit that
calculates a correction coefficient on a basis of the difference signal, and
corrects one of the first detection signal and the second detection signal by using the correction coefficient.

(6) The signal processing apparatus according to (5), in which
the correction circuit corrects the first detection signal by using the correction coefficient in a case where one of the first detection signal and the second detection signal has a predetermined acceleration change or larger.

(7) The signal processing apparatus according to (5) or (6), in which
the correction circuit corrects the second detection signal by using the correction coefficient in a case where one of the first detection signal and the second detection signal has a predetermined acceleration change or smaller.

(8) The signal processing apparatus according to any one of (2) to (7), in which
the acceleration arithmetic unit further includes a low-frequency sensitivity correction unit that corrects the dynamic acceleration component and the static acceleration component by using a composite value of the difference signals calculated for the respective multi-axial directions.

(9) The signal processing apparatus according to (3) or (4), in which
the arithmetic circuit includes
a low-pass filter that causes a low-frequency component including the direct-current component to pass therethrough from the second detection signal, and
a first subtracter that calculates a difference between the first detection signal and an output signal of the low-pass filter.

(10) The signal processing apparatus according to (9), in which
the arithmetic circuit further includes
a second subtracter that calculates a difference between the output signal of the low-pass filter and an output signal of the first subtracter, and
an adder that adds the first detection signal and an output signal of the second subtracter.

(11) The signal processing apparatus according to any one of (1) to (10), in which
the acceleration arithmetic unit outputs the dynamic acceleration component and the static acceleration component in parallel.

(12) The signal processing apparatus according to any one of (1) to (10), in which
the acceleration arithmetic unit outputs the dynamic acceleration component and the static acceleration component sequentially.

(13) The signal processing apparatus according to any one of (1) to (10), further including
an angular velocity arithmetic unit that calculates, on a basis of a third detection signal including information related to angular velocities about multiple axes including the uniaxial direction, each of the angular velocities about the multiple axes.

(14) An inertial sensor, including:
a sensor element including
an element main body that includes a movable portion movable by reception of an acceleration along at least a uniaxial direction,
a first acceleration detector unit that outputs a first detection signal, the first detection signal including information related to the acceleration that acts on the movable portion and having an alternating-current waveform corresponding to the acceleration, and
a second acceleration detector unit that outputs a second detection signal, the second detection signal including the information related to the acceleration and having an output waveform in which an alternating-current component corresponding to the acceleration is superimposed on a direct-current component; and
a controller including
an acceleration arithmetic unit that extracts a dynamic acceleration component and a static acceleration component from the acceleration on a basis of the first detection signal and the second detection signal.

(15) The inertial sensor according to (14), in which
the first acceleration detector unit includes a piezoelectric acceleration detection element that is provided to the movable portion.

(16) The inertial sensor according to (14) or (15), in which
the second acceleration detector unit includes a piezoresistive acceleration detection element that is provided to the movable portion.

(17) The inertial sensor according to (14) or (15), in which
the second acceleration detector unit includes an electrostatic acceleration detection element that is provided to the movable portion.

(18) An acceleration measurement method, including:
acquiring a first detection signal including information related to an acceleration along at least a uniaxial direction and having an alternating-current waveform corresponding to the acceleration;
acquiring a second detection signal including the information related to the acceleration and having an output waveform in which an alternating-current component corresponding to the acceleration is superimposed on a direct-current component; and
extracting a dynamic acceleration component and a static acceleration component from the acceleration on a basis of the first detection signal and the second detection signal.

(19) An electronic apparatus, including
an inertial sensor including
a sensor element including
an element main body that includes a movable portion movable by reception of an acceleration along at least a uniaxial direction,
a first acceleration detector unit that outputs a first detection signal, the first detection signal including information related to the acceleration that acts on the movable portion and having an alternating-current waveform corresponding to the acceleration, and
a second acceleration detector unit that outputs a second detection signal, the second detection signal including the information related to the acceleration and having an output waveform in which an alternating-current component corresponding to the acceleration is superimposed on a direct-current component, and
a controller including
an acceleration arithmetic unit that extracts a dynamic acceleration component and a static acceleration component from the acceleration on a basis of the first detection signal and the second detection signal.

(20) A program causing a signal processing apparatus to execute:
acquiring a first detection signal including information related to an acceleration along at least a uniaxial direction and having an alternating-current waveform corresponding to the acceleration;
acquiring a second detection signal including the information related to the acceleration and having an output waveform in which an alternating-current component corresponding to the acceleration is superimposed on a direct-current component; and
extracting a dynamic acceleration component and a static acceleration component from the acceleration on a basis of the first detection signal and the second detection signal.

REFERENCE SIGNS LIST 1, 2 inertial sensor
10 sensor element
11 (11x1, 11x2, 11y1, 11y2) first acceleration detector unit 12 (12x1, 12x2, 12y1, 12y2) second acceleration detector unit
20, 220 controller
21 gain adjustment circuit
24 correction circuit
110 element main body
120 movable plate
200 acceleration arithmetic unit
300 angular velocity arithmetic unit

The invention claimed is:

1. A signal processing apparatus, comprising
an acceleration arithmetic unit that extracts, on a basis of a first detection signal and a second detection signal, the first detection signal including information related to an acceleration along at least a uniaxial direction and having an alternating-current waveform corresponding to the acceleration, the second detection signal including the information related to the acceleration and having an output waveform in which an alternating-current component corresponding to the acceleration is superimposed on a direct-current component, a dynamic acceleration component and a static acceleration component from the acceleration.

2. The signal processing apparatus according to claim 1, wherein
each of the first detection signal and the second detection signal further includes information related to accelerations in multiaxial directions including the uniaxial direction, and
the acceleration arithmetic unit extracts the dynamic acceleration component and the static acceleration component for each of the multiaxial directions.

3. The signal processing apparatus according to claim 1, wherein
the acceleration arithmetic unit includes an arithmetic circuit that extracts the static acceleration component from the acceleration on a basis of a difference signal between the first detection signal and the second detection signal.

4. The signal processing apparatus according to claim 3, wherein
the acceleration arithmetic unit further includes a gain adjustment circuit that adjusts gain of each signal such that the first detection signal and the second detection signal have an identical level.

5. The signal processing apparatus according to claim 3, wherein
the acceleration arithmetic unit further includes a correction circuit that
calculates a correction coefficient on a basis of the difference signal, and
corrects one of the first detection signal and the second detection signal by using the correction coefficient.

6. The signal processing apparatus according to claim 5, wherein
the correction circuit corrects the first detection signal by using the correction coefficient in a case where one of the first detection signal and the second detection signal has a predetermined acceleration change or larger.

7. The signal processing apparatus according to claim 5, wherein
the correction circuit corrects the second detection signal by using the correction coefficient in a case where one of the first detection signal and the second detection signal has a predetermined acceleration change or smaller.

8. The signal processing apparatus according to claim 2, wherein
the acceleration arithmetic unit further includes a low-frequency sensitivity correction unit that corrects the dynamic acceleration component and the static acceleration component by using a composite value of difference signals calculated for the respective multi-axial directions.

9. The signal processing apparatus according to claim 3, wherein
the arithmetic circuit includes
a low-pass filter that causes a low-frequency component including the direct-current component to pass therethrough from the second detection signal, and
a first subtracter that calculates a difference between the first detection signal and an output signal of the low-pass filter.

10. The signal processing apparatus according to claim 9, wherein
the arithmetic circuit further includes
a second subtracter that calculates a difference between the output signal of the low-pass filter and an output signal of the first subtracter, and
an adder that adds the first detection signal and an output signal of the second subtracter.

11. The signal processing apparatus according to claim 1, wherein
the acceleration arithmetic unit outputs the dynamic acceleration component and the static acceleration component in parallel.

12. The signal processing apparatus according to claim 1, wherein
the acceleration arithmetic unit outputs the dynamic acceleration component and the static acceleration component sequentially.

13. The signal processing apparatus according to claim 1, further comprising
an angular velocity arithmetic unit that calculates, on a basis of a third detection signal including information related to angular velocities about multiple axes including the uniaxial direction, each of the angular velocities about the multiple axes.

14. An inertial sensor, comprising:
a sensor element including
an element main body that includes a movable portion movable by reception of an acceleration along at least a uniaxial direction,
a first acceleration detector unit that outputs a first detection signal, the first detection signal including information related to the acceleration that acts on the movable portion and having an alternating-current waveform corresponding to the acceleration, and
a second acceleration detector unit that outputs a second detection signal, the second detection signal including the information related to the acceleration and having an output waveform in which an alternating-current component corresponding to the acceleration is superimposed on a direct-current component; and
a controller including
an acceleration arithmetic unit that extracts a dynamic acceleration component and a static acceleration component from the acceleration on a basis of the first detection signal and the second detection signal.

15. The inertial sensor according to claim 14, wherein the first acceleration detector unit includes a piezoelectric acceleration detection element that is provided to the movable portion.

16. The inertial sensor according to claim 14, wherein the second acceleration detector unit includes a piezoresistive acceleration detection element that is provided to the movable portion.

17. The inertial sensor according to claim 14, wherein the second acceleration detector unit includes an electrostatic acceleration detection element that is provided to the movable portion.

18. An acceleration measurement method, comprising:
acquiring a first detection signal including information related to an acceleration along at least a uniaxial direction and having an alternating-current waveform corresponding to the acceleration;
acquiring a second detection signal including the information related to the acceleration and having an output waveform in which an alternating-current component corresponding to the acceleration is superimposed on a direct-current component; and
extracting a dynamic acceleration component and a static acceleration component from the acceleration on a basis of the first detection signal and the second detection signal.

19. An electronic apparatus, comprising
an inertial sensor including
a sensor element including
an element main body that includes a movable portion movable by reception of an acceleration along at least a uniaxial direction,
a first acceleration detector unit that outputs a first detection signal, the first detection signal including information related to the acceleration that acts on the movable portion and having an alternating-current waveform corresponding to the acceleration, and
a second acceleration detector unit that outputs a second detection signal, the second detection signal including the information related to the acceleration and having an output waveform in which an alternating-current component corresponding to the acceleration is superimposed on a direct-current component, and
a controller including
an acceleration arithmetic unit that extracts a dynamic acceleration component and a static acceleration component from the acceleration on a basis of the first detection signal and the second detection signal.

20. A non-transitory computer-readable medium having stored thereon computer-executable instructions which, when executed by a processor, cause the processor to execute operations, the operations comprising:
acquiring a first detection signal including information related to an acceleration along at least a uniaxial direction and having an alternating-current waveform corresponding to the acceleration;
acquiring a second detection signal including the information related to the acceleration and having an output waveform in which an alternating-current component corresponding to the acceleration is superimposed on a direct-current component; and
extracting a dynamic acceleration component and a static acceleration component from the acceleration on a basis of the first detection signal and the second detection signal.

* * * * *